United States Patent
Slack et al.

(10) Patent No.: US 10,670,431 B2
(45) Date of Patent: Jun. 2, 2020

(54) ENCODER APPARATUS THAT INCLUDES A SCALE AND A READHEAD THAT ARE MOVABLE RELATIVE TO EACH OTHER CONFIGURED TO REDUCE THE ADVERSE EFFECT OF UNDESIRABLE FREQUENCIES IN THE SCALE SIGNAL TO REDUCE THE ENCODER SUB-DIVISIONAL ERROR

(71) Applicant: RENISHAW PLC, Wotton-under-Edge, Gloucestershire (GB)

(72) Inventors: Jason Slack, Bristol (GB); Richard James Bale, Bristol (GB)

(73) Assignee: RENISHAW PLC, Wotton-Under-Edge (GB)

( * ) Notice: Subject to any disclaimer, the term of this patent is extended or adjusted under 35 U.S.C. 154(b) by 53 days.

(21) Appl. No.: 15/749,404

(22) PCT Filed: Sep. 8, 2016

(86) PCT No.: PCT/GB2016/052781
§ 371 (c)(1),
(2) Date: Jan. 31, 2018

(87) PCT Pub. No.: WO2017/042570
PCT Pub. Date: Mar. 16, 2017

(65) Prior Publication Data
US 2018/0216972 A1 Aug. 2, 2018

(30) Foreign Application Priority Data
Sep. 9, 2015 (EP) .................................. 15184459

(51) Int. Cl.
*G01D 5/244* (2006.01)
*G01D 5/347* (2006.01)
*G01D 5/38* (2006.01)

(52) U.S. Cl.
CPC ....... *G01D 5/34723* (2013.01); *G01D 5/2448* (2013.01); *G01D 5/24438* (2013.01); *G01D 5/34715* (2013.01); *G01D 5/38* (2013.01)

(58) Field of Classification Search
CPC .. G01D 5/34715; G01D 5/34792; G01D 5/38; G01D 5/24438; G01D 5/34776; G01D 5/2448; G01D 5/34723; H03M 1/206
(Continued)

(56) References Cited

U.S. PATENT DOCUMENTS

| 3,553,470 A | 1/1971 | Dench et al. |
| 3,586,665 A | 6/1971 | Weyrauch |

(Continued)

FOREIGN PATENT DOCUMENTS

| CN | 1129837 A | 8/1996 |
| CN | 102564462 A | 7/2012 |

(Continued)

OTHER PUBLICATIONS

"Safety first—the position determination and checking algorithms of RESOLUTE™ True-absolute optical encoder," White paper, Renishaw plc, 2012, pp. 1-3.

(Continued)

*Primary Examiner* — Que Tan Le
(74) *Attorney, Agent, or Firm* — Oliff PLC

(57) ABSTRACT

An encoder apparatus including a scale and a readhead including a sensor including an array of sensor elements for detecting a scale signal falling on the sensor, configured such that the sensor elements' outputs that are used to determine the relative position of the scale and readhead are weighted such that the influence of the sensor elements on the determined relative position of the scale and readhead varies across the array according to a predetermined non-rectangular window function that is configured to reduce the (Continued)

adverse effect of undesirable frequencies in the scale signal so as to thereby reduce the encoder apparatus' sub-divisional error.

27 Claims, 14 Drawing Sheets

(58) Field of Classification Search
USPC .................................................. 250/231.13
See application file for complete search history.

(56) References Cited

U.S. PATENT DOCUMENTS

| | | | |
|---|---|---|---|
| 3,674,372 | A | 7/1972 | Weyrauch |
| 4,595,991 | A | 6/1986 | Spies |
| 4,782,229 | A | 11/1988 | Ernst |
| 4,949,289 | A | 8/1990 | Stephens et al. |
| 5,708,756 | A | 1/1998 | Wang et al. |
| 5,861,953 | A | 1/1999 | Henshaw |
| 7,394,061 | B2 * | 7/2008 | Bin Saidan ........ G01D 5/34792 250/231.13 |
| 8,525,102 | B2 | 9/2013 | Augustyniak et al. |
| 2003/0047673 | A1 | 3/2003 | Thorburn et al. |
| 2012/0025812 | A1 | 2/2012 | Dolsak |

FOREIGN PATENT DOCUMENTS

| | | |
|---|---|---|
| EP | 2 439 498 A1 | 4/2012 |
| EP | 2 511 670 A2 | 10/2012 |
| EP | 2 894 437 A2 | 7/2015 |
| JP | 2008-014806 A | 1/2008 |
| WO | 2008/053184 A1 | 5/2008 |
| WO | 2010/100407 A1 | 9/2010 |
| WO | 2010/100409 A1 | 9/2010 |
| WO | 2010/139964 A2 | 12/2010 |
| WO | 2015/049174 A1 | 4/2015 |

OTHER PUBLICATIONS

"Weighting," Wikipedia, retrieved Mar. 31, 2015, [http://en.wikipedia.org/wiki/Weighting].

"Window function," Wikipedia, retrieved Mar. 31, 2015, [http://en.wikipedia.org/wiki/Window_function].

Apr. 18, 2016 Partial Search Report issued in European Patent Application No. 15 18 4459.

Dec. 14, 2016 International Search Report issued in International Patent Application No. PCT/GB2016/052781.

Dec. 14, 2016 Written Opinion of the International Searching Authority issued in International Patent Application No. PCT/GB2016/052781.

* cited by examiner

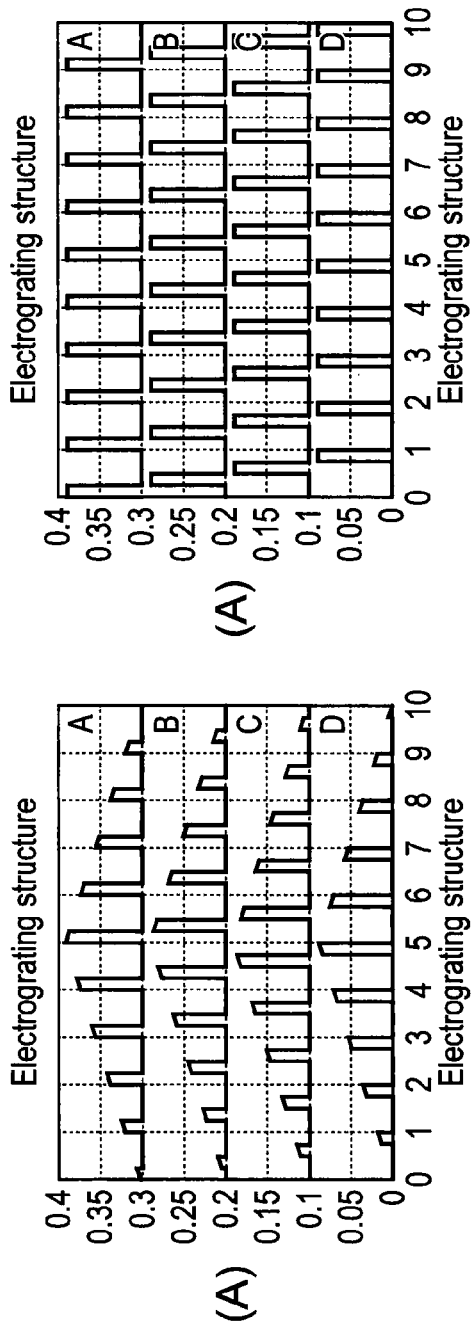
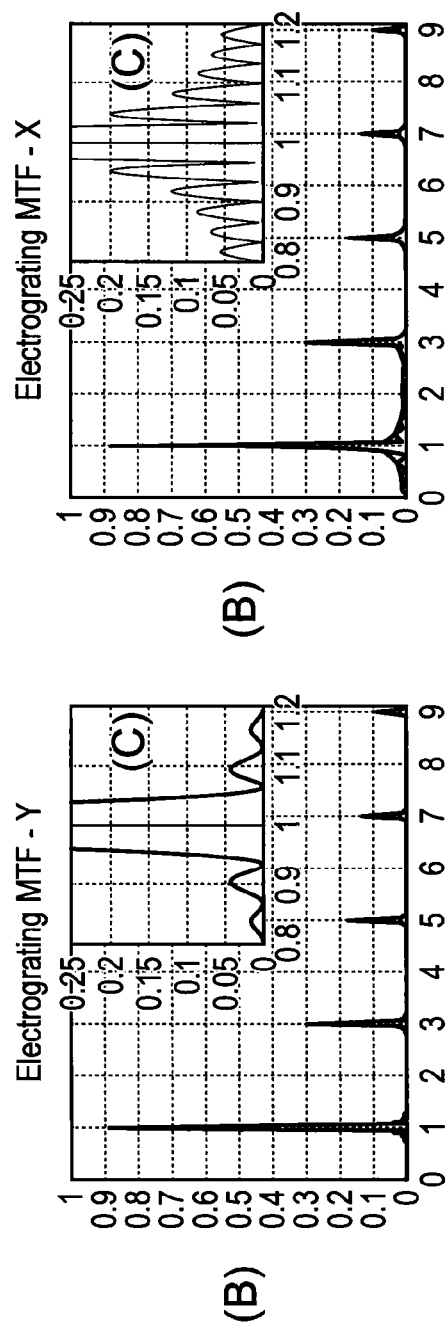
FIG. 10
FIG. 11

ENCODER APPARATUS THAT INCLUDES A SCALE AND A READHEAD THAT ARE MOVABLE RELATIVE TO EACH OTHER CONFIGURED TO REDUCE THE ADVERSE EFFECT OF UNDESIRABLE FREQUENCIES IN THE SCALE SIGNAL TO REDUCE THE ENCODER SUB-DIVISIONAL ERROR

BACKGROUND

This invention relates to an encoder apparatus, in particular a position measurement encoder apparatus comprising a scale and a readhead which are moveable relative to each other.

As is well known, a position measurement encoder apparatus typically comprises a scale having a series of features which the readhead can read to determine and measure relative position (and its derivatives such as velocity and/or acceleration). Encoders are typically categorised as being either incremental or absolute. A scale for an incremental encoder (such as the TONiC™ encoder available from Renishaw plc and described in more detail below) comprises a series of generally periodic features which the readhead detects to determine a relative position and movement of the scale and readhead. One or more reference marks can be provided on the scale to provide reference positions from which the relative position of the scale and readhead can be counted. A scale for an absolute encoder (such as the RESOLUTE™ encoder available from Renishaw plc and described in more detail below) comprises features defining unique positions along the scale length, for instance a series of unique absolute positions, and can enable a readhead to determine its absolute position on start-up without requiring any relative motion.

SUMMARY

Our inventors wanted to provide an improved encoder, in particular an encoder with improved accuracy.

As is well known in the field of position measurement encoders, sub-divisional error (SDE) occurs due to imperfections in the interpolation of a reading of scale features. Such imperfections can be due to the way in which the reading is processed, and/or due to the signal detected by the readhead being imperfect. The signal detected by the readhead could be imperfect for numerous reasons, e.g. due to sub-optimal optical components, sub-optimal arrangement of the optical components, dirt on the scale, and/or reference marks, e.g. embedded reference marks. SDE adversely affects the accuracy of the determined position. SDE is also commonly known as "interpolation error". In this document, the terms SDE and interpolation error can be used interchangeably. As will be understood, an encoder apparatus' SDE can vary along the extent of the scale (e.g. along its length for a linear encoder or about the axis for the rotary encoder).

The present invention provides a configuration for improving the output of an encoder apparatus, for example by reducing an encoder apparatus' SDE, such as for example SDE is caused by imperfections in the signal falling on the readhead's sensor. This is achieved by configuring the encoder apparatus such that (e.g. the output of) the sensor is weighted along its length (e.g. the outputs of the sensor's sensor elements are weighted) according to a predetermined window function which is configured to make the encoder apparatus less sensitive to (e.g. in some embodiments to have a filtering effect on) such imperfections in the signal falling on the sensor.

For example, there is described herein an encoder apparatus comprising a scale and a readhead comprising a sensor comprising an array of sensor elements for detecting a scale signal falling on the sensor, configured such that the sensor elements' outputs that are used to determine the relative position of the scale and readhead (e.g. to within a scale period) are weighted such that the influence of the sensor elements on the determined relative position of the scale and readhead varies across the array according to a predetermined non-rectangular window function that is configured to reduce the adverse effect of (e.g. filter) undesirable frequencies in the scale signal so as to thereby reduce the encoder apparatus' sub-divisional error.

According to a first aspect of the invention there is an incremental encoder apparatus comprising a scale and a readhead comprising a sensor comprising an array of sensor elements for detecting a scale signal falling on the sensor which is used to determine the relative position of the scale and readhead (e.g. to within a scale period), in which the apparatus is configured such that the output of the sensor along its length is weighted according to a (predetermined) window function that is configured to reduce the adverse effect of undesirable frequencies in the scale signal (e.g. so as to thereby reduce the encoder apparatus' sub-divisional error), in which said weighting is configured such that the influence of the sensor output on the determined relative position predominantly decreases towards the ends of the sensor.

It has been found that rather than using an unweighted/rectangular array of sensor elements, a non-rectangular window function can be used to weight the sensor elements' outputs so as to significantly reduce the adverse impact the presence of undesirable frequencies has on an encoder apparatus' measurement performance. Such weighting can be configured so as to substantially filter said undesirable frequencies. In particular, it has been found that the use of such weighting has the effect of reducing the sensitivity of the encoder apparatus to such undesirable frequencies. Accordingly, such weighting can be used to reduce the encoder apparatus' SDE, which can in turn improve the accuracy of the encoder apparatus. In the case of an incremental encoder, comprising quadrature signals which can be used to produce a Lissajous, reducing the SDE improves the circularity of the Lissajous.

As will be understood, those frequencies which are considered to be "undesirable frequencies" will vary from encoder apparatus to encoder apparatus. Nevertheless, as will be understood, what is meant by "undesirable frequencies" are frequencies which contribute to an encoder apparatus' SDE. For example, undesirable frequencies can comprise those frequencies which result in the presence of a non-integer number of cycles over the extent of the sensor of at least a component frequency of the scale signal. For instance, such a non-integer number of cycles of at least a component frequency of the signal falling on the sensor could for instance be due to image magnification (e.g. in an image based system) or fringe and sensor period mismatch (e.g. in a diffraction based system) which can vary with ride-height, and/or due to the presence of a non-harmonic component in the signal. In embodiments in which the sensor comprises a repeating arrangement of two or more sets of interdigitated/interleaved sensor elements (e.g. an incremental detector having multiple channels), undesirable frequencies can comprise frequencies which are non-integer multiples of the frequency of the repeat. These are explained in more detail below in connection with specific example embodiments of the invention. Accordingly, weighting according to the invention can reduce the sensitivity of the encoder apparatus to the presence of a non-integer number of cycles over the extent of the sensor of at least a component frequency of the scale signal.

As will be understood, such weighting of the sensor (e.g. of the outputs of the sensor elements) according to the (e.g. predetermined non-rectangular) window function can be configured so as to suppress the side lobes of the (e.g. spatial) frequency response of the sensor. Preferably, the window function is configured (e.g. shaped) such that the magnitude of at least the primary side lobe of the sensor's (e.g. spatial) frequency response is not more than 10% of the magnitude of the main lobe, more preferably not more than 5%, for example not more than 2.5%, for instance not more than 1%. As will be understood, the frequency response of a sensor can be determined by/defined as a spatial Fourier Transform of the sensor responsivity/responsiveness.

As will be understood, the invention can be achieved via various appropriate weighting schemes. Optionally, the sensor output is weighted (e.g. the sensor elements' outputs are weighted) such that the influence of the output from the sensor on the determined position generally progressively decreases towards the ends of the sensor. Optionally, said decrease is smooth, in other words continuous.

Optionally, the weighting is configured such that the middle of the sensor has the most significant influence on the determined position (e.g. the sensor elements toward (e.g. at) the centre of the sensor have the most significant influence on the determined position). In other words, optionally said influence peaks toward (e.g. at) the centre of the sensor. As will be understood, the weighting could be configured such that a plurality of sensor elements at and near the middle of the sensor have the same influence (e.g. such that the window function has a flat region at its centre). Optionally, the weighting is configured such that said window is substantially symmetrical about the sensor's centre line. Optionally, the outputs are weighted such that there is a downward/decreasing trend in the influence that the output of the sensors elements have on the determined position (e.g. from a position at/near to the middle of the array towards the ends of the array).

Optionally, the output of the sensor is weighted such that the influence of the output from sensor on the determined position generally progressively decreases towards the ends of the sensor such that the influence of the sensor towards (e.g. at) the ends of the sensor is at most 25% of the influence of the sensor towards (e.g. at) the middle of the sensor. In other words, optionally, the sensor elements' outputs are weighted such that the influence of the output from sensor elements on the determined position generally progressively decreases towards the ends of the sensor such that the influence of the sensor elements towards (e.g. at) the ends of the sensor is at most 25% of the influence of the sensor elements towards (e.g. at) the middle of the sensor.

The sensor could notionally be divided into segments or portions, and the influence of the sensor on the determined relative position could be different for different segments or portions along its length. Optionally, the sensor could notionally be divided into three substantially equal segments/portions along its length; in other words could be divided into thirds. Optionally, the influence of the sensor output on the determined relative position is greater at the middle third of the sensor than at the outer thirds of the sensor. For example, the influence of the outer thirds could each be at most 50% of the influence of the middle third. Optionally, the sensor could notionally be divided into five substantially equal segments/portions along its length; in other words could be divided into fifths along its length. Optionally, the influence of the sensor output on the determined relative position is greater at the middle fifth of the sensor, than the outer fifths of the sensor. For example, the influence of the outer fifths could each be at most 30% of the influence of the middle fifth. In this case, optionally, the influence of the sensor output on the determined relative position is greater at the middle fifth of the sensor, than the adjacent fifths of the sensor either side of the middle fifth.

Said weighting can be effected by manipulating the output of the sensor elements. For example, said weighting can be effected by using one or more attenuators (e.g. resistor) and/or one or more amplifiers (e.g. operational amplifier) to suppress and/or amplify the sensor elements' outputs. Optionally, weighting can be effected by missing out sensor elements. For example, in an array of sensor elements having a periodic arrangement of sensor elements, weighting can be achieved by missing out one or more of the sensor elements.

Optionally, said weighting can be effected by restricting the signal that the sensor (e.g. the sensor elements) can detect. For example, the readhead can be configured to generally progressively restrict the signal that the sensor (e.g. the sensor elements) can detect towards the ends of the sensor. This could be achieved by configuring the scale signal's footprint falling on the sensor. Optionally, a signal manipulating/restricting member is provided which is configured to restrict the (e.g. amount/power/intensity/magnitude) of scale signal reaching the sensor elements by varying amounts across the array, e.g. such that the extent of said restriction progressively increases towards the ends of the sensor. In other words the signal manipulating/restricting member can be configured such that the amount of scale signal falling on the sensor progressively decreases towards the ends of the sensor, e.g. towards the ends of the array of sensor elements. Optionally, this can be achieved by providing a signal blocking member which is configured to block the scale signal reaching the sensor (e.g. the sensor elements) by varying amounts across the array, e.g. such that the extent of said blocking progressively increases towards the ends of the sensor; in other words such that the amount of scale signal falling on the sensor progressively decreases towards the ends of the sensor, e.g. towards the ends of the array of sensor elements. Optionally, the encoder apparatus comprises a mask (in other words a physical window) having a non-rectangular shape. In other words, the mask can have a non-rectangular shaped aperture through which the scale signal can pass so as to reach the sensor. In embodiments in which the encoder apparatus is an optical encoder apparatus the mask can comprise a non-rectangular aperture, spaced apart from a light source and through which light approaching or leaving the scale can pass, so as to shape the footprint of the signal detectable by the sensor. Optionally, the mask is formed (in other words provided) directly on the sensor (e.g. on the sensor elements). For example, the mask can comprise a layer (e.g. metallisation, polymer layer) deposited on top of the sensor (e.g. on top of the sensor elements). Optionally, the encoder apparatus comprises an illumination system comprising a light source. Optionally, at least one light manipulating/restricting member spaced from the light source is provided and is configured such that the effective footprint of light detectable by the sensor predominantly decreases in size towards the ends of the sensor.

Optionally, the shape and/or size of the sensor can be configured so as to generally progressively restrict the amount of signal that the sensor detects towards the ends of the sensor (e.g. the width of the sensor can reduce towards the ends of the sensor). In other words, optionally, the shape and/or size of the sensor elements can be configured so as to generally progressively restrict the amount of signal that the sensor elements detect towards the ends of the sensor (e.g. they could get smaller, e.g. shorter in length, towards the ends of the sensor).

Optionally, the weighting of the sensor output along its length is configured such that the influence of the output on the determined position decreases non-linearly toward the ends of the array. In other words, optionally the weighting of the sensor elements outputs is configured such that their influence on the determined position decreases non-linearly toward the ends of the array. Accordingly, preferably the shape of the window-function is not a straight-sided triangle. In other words, it can be the case that the general rate at which the influence of the sensor output on the determined position decreases toward the ends of the sensor is not constant (in other words, the local trend of the rate of decrease is not constant). It can be preferred that the weighting is configured such that the influence of the sensor output on the determined position tapers-off (in other words, gradually diminishes) towards the ends of the sensor.

Optionally, the weighting of the sensor output along its length (e.g. the weighting of the sensor elements' outputs) is configured such that the rate of decrease in influence of the sensor on the determined position, reduces toward the ends of the sensor. In other words, optionally, the local trend of the rate of decrease, reduces towards the ends of the array. Preferably, the weighting of the sensor output along its length is configured such that the rate of decrease in influence of the sensor output on the determined position from the centre of the sensor toward the ends of the sensor, initially increases and then reduces toward the ends of the sensor. In other words, the local trend of the rate of decrease in influence, initially increases and then reduces. Another way of putting this is that the slope/gradient of the weighting initially increases away from the middle of the sensor before decreasing towards the ends of the sensor. For instance, the gradient of the window/weighting (for example the rate at which the photodiodes are increasingly blocked) is relatively shallow at and near the middle of the sensor, then steepens with distance away from the middle of the sensor before becoming shallow again near the ends of the sensor. Accordingly, the weighting of the sensor output could be such that the general shape of the window-function is approximately bell-shaped. For example, optionally, the outputs of the sensor elements are weighted according to one of the following functions: Kaiser, Hann, Hamming, Welch, Chebyshev, Cosine, Slepian, Gaussian, Lanczos, Parzen, Blackman, Nuttall, Tukey or any hybrid of these.

The encoder apparatus could be what is commonly referred to as an optical encoder. The readhead can comprise a light source which is configured to illuminate the scale. The scale signal could comprise a light field. Optionally, the encoder apparatus is configured to illuminate the scale with non-collimated light. The readhead can comprise a coherent light source for illuminating the scale. Optionally, the spectral bandwidth of the light source is not more than 1 nm, for example not more than 0.5 nm, for example not more than 0.2 nm, for instance approximately 0.1 nm.

The encoder apparatus could comprise an incremental encoder apparatus. Accordingly, the scale could comprise an incremental scale. The scale could comprise at least one track comprising a series of (generally) periodically arranged features. As will be understood, one or more reference features, next to or embedded within said at least one track could be provided.

Optionally, the scale signal (e.g. the light field) comprises a fringe (e.g. fringe field). The fringe could comprise an interference fringe. The readhead can comprise one or more diffraction gratings for producing said interference fringe. For example, the one or more diffraction gratings can interact with light heading towards/from the scale so as to produce said interference fringe. Optionally, the readhead comprises a diffraction grating configured to interact with light leaving the scale so as to produce said interference fringe. Optionally, the scale comprises a series of features configured to diffract light. Optionally, said interference fringe is produced by the recombination of diffracted orders of light from the scale and diffraction grating (and optionally in that order). Accordingly, optionally there is no diffraction grating in the optical path before the scale. As will be understood, the readhead does not necessarily need to comprise a diffraction grating. For example, the readhead could detect an image of the scale as described in more detail below.

Optionally, the sensor comprises an electrograting comprising two or more sets of interdigitated/interleaved sensor elements, each set being configured to detect a different phase of the interference fringe. Each set could be referred to as a channel. Preferably, the sensor (e.g. the electrograting) is non-aliased. In other words, preferably the distance between the sensor elements in each set (e.g. channel) is nominally one fringe period.

Optionally, the scale signal comprises an image of the scale. Accordingly, the readhead can be configured to image the scale onto the sensor. Optionally, the readhead comprises one or more lenses configured to form an image of the scale on the sensor. Optionally, the sensor is configured to capture said image.

Optionally, the scale signal comprises features that are misaligned with the sensor elements, e.g. extend non-parallel to the sensor elements. Optionally, the scale signal comprises non-parallel features. Optionally, the scale signal comprises fanned features. Optionally, the scale comprises a disc scale. Optionally, said disc scale comprises scale features arranged on a face of the disc. Optionally, said scale features are misaligned (e.g. are non-parallel) with respect to the sensor elements when the scale and readhead are in a reading position. Optionally, said scale features are fanned. Said scale features can be incremental scale features and/or absolute scale features.

The encoder apparatus can be an absolute encoder apparatus. Accordingly, the scale can comprise an absolute scale. In other words, the scale can comprise features defining absolute position information. The scale can comprise features defining a series of unique absolute positions. The features defining the absolute position information could be contained in at least one track. In addition to features defining absolute position information the scale can comprise features defining incremental position. For example, the scale could comprise a track comprising a series of generally periodically arranged features.

The encoder apparatus could be configured to process the scale signal according to at least two techniques/in two stages. In this case, the encoder apparatus could be configured such that the sensor elements' outputs used by one of said techniques are weighted according to the invention, but not weighted for another one of said techniques. For instance, the encoder apparatus could be configured to determine from an image of the scale, coarse position information (using a first technique) and fine position information (using a second technique). Coarse position information can be a measure of the relative position of the scale and readhead to a resolution of one or more scale periods. Fine position information can be a measure of the relative position of the scale and readhead to a resolution finer than the coarse position. For instance, it could be a measure of the relative position of the scale and readhead to a resolution finer than one scale period. This could be done via, for instance, phase extraction. An example of such a method for determining a position is described in more detail in WO2010/139964, the entire content of which is incorporated by this reference. In such a case the same sensor element outputs could be used for both the coarse and the fine position determination. However, the encoder apparatus could be configured such that the sensor element outputs that are passed to the process for determining the fine position are weighted according to the invention, whereas the sensor elements outputs that are passed to the process for determining the coarse position are not weighted. For example, this could be achieved by splitting the sensor elements' outputs into first and second signals, in which for the first signal the raw output is passed to one process and in which for the second signal attenuator(s) and/or amplifier(s) is(are) used to suppress and/or amplify the outputs accordingly before they are passed to the other process.

According to another aspect of the invention there is provided a readhead configured according to the above. For example, according to another aspect of the invention there is provided a readhead comprising a sensor comprising an array of sensor elements for detecting a scale signal falling on the sensor, configured such that the sensor elements' outputs that are used to determine the relative position of the scale and readhead are weighted such that the influence of the sensor elements on the determined relative position of the scale and readhead varies across the array according to a predetermined non-rectangular window function that is configured to reduce the adverse effect of undesirable frequencies in the scale signal so as to thereby reduce the encoder apparatus' sub-divisional error. According to a particular example there is provided a readhead comprising a sensor comprising an array of sensor elements for detecting a scale signal falling on the sensor which is used to determine the relative position of the scale and readhead, in which the readhead is configured such that the output of the sensor along its length is weighted according to a window function that is configured to reduce the adverse effect of undesirable frequencies in the scale signal so as to thereby reduce the encoder apparatus' sub-divisional error, in which said weighting is configured such that the influence of the sensor output on the determined relative position predominantly decreases towards the ends of the sensor. According to another particular example embodiment, there is provided a readhead comprising a sensor comprising an array of sensor elements for detecting a scale signal falling on the sensor, in which the sensor elements' outputs that are used to determine the relative position of the scale and readhead are such that the influence of the output from sensor elements on the determined relative position generally progressively decreases towards the ends of the sensor. Optionally, said weighting is effected by restricting the amount of signal that the sensor (e.g. the sensor elements) can detect. For example, the shape and/or size of the sensor/sensor elements can be configured so as to generally progressively restrict the amount of signal that the sensor sensor/elements detect towards the ends of the sensor (e.g. they could get smaller, e.g. shorter in length, towards the ends of the sensor).

According to another aspect of the invention there is provided a readhead comprising a sensor comprising an array of sensor elements for detecting a scale signal falling on the sensor, and at least one separate reference mark sensor for detecting at least one reference mark on the scale, in which the at least one reference mark sensor is not positioned within the array of sensor elements, and in which the width of the sensor decreases towards the ends of the sensor, and/or which comprises at least one signal restricting member configured to restrict the amount of scale signal reaching the sensor elements such that the amount of scale signal as detected by the sensor decreases towards the ends of the sensor.

According to another aspect of the invention there is provided an absolute encoder apparatus comprising a scale having markings defining a series of unique positions, and a readhead comprising a sensor comprising an array of sensor elements for detecting a scale signal falling on the sensor, in which the width of the sensor decreases in size towards the ends of the sensor, and/or which comprises at least one signal restricting member configured to restrict the scale signal from reaching the sensor elements such that the amount of scale signal as detected by the sensor decreases towards the ends of the array.

According to another aspect of the invention there is provided a readhead comprising a sensor comprising an array of sensor elements for detecting a scale signal falling on the sensor, in which the readhead is configured such that the sensor elements' outputs that are used to determine the relative position of the scale and readhead are weighted such that the magnitude of at least the primary side lobe of the sensor's frequency response is not more than 10% of the magnitude of the main lobe.

According to another aspect of the invention there is provided a readhead comprising a sensor comprising an array of sensor elements for detecting a scale signal falling on the sensor which is used to determine the relative position of the scale and readhead, in which the readhead is configured such that the output of the sensor along its length is weighted such that the influence of the sensor output on the determined relative position is substantially greater at the middle third of the sensor than at the outer thirds of the sensor.

BRIEF DESCRIPTION OF THE DRAWINGS

Embodiments of the invention will now be described, by way of example only, with reference to the following drawings, in which:

FIG. 6b illustrates the Fourier Transform of the interference fringe of FIG. 6a;

FIG. 10 comprises two graphs, respectively illustrating the electrograting structure of the electrograting of FIG. 9, along with the Modulation Transfer Function (MTF) of the electrograting of FIG. 9;

FIG. 11 comprises two graphs, respectively illustrating the electrograting structure of a standard unweighted electrograting, along with the Modulation Transfer Function (MTF) of such an electrograting;

DETAILED DESCRIPTION OF EMBODIMENTS

Figure 1:
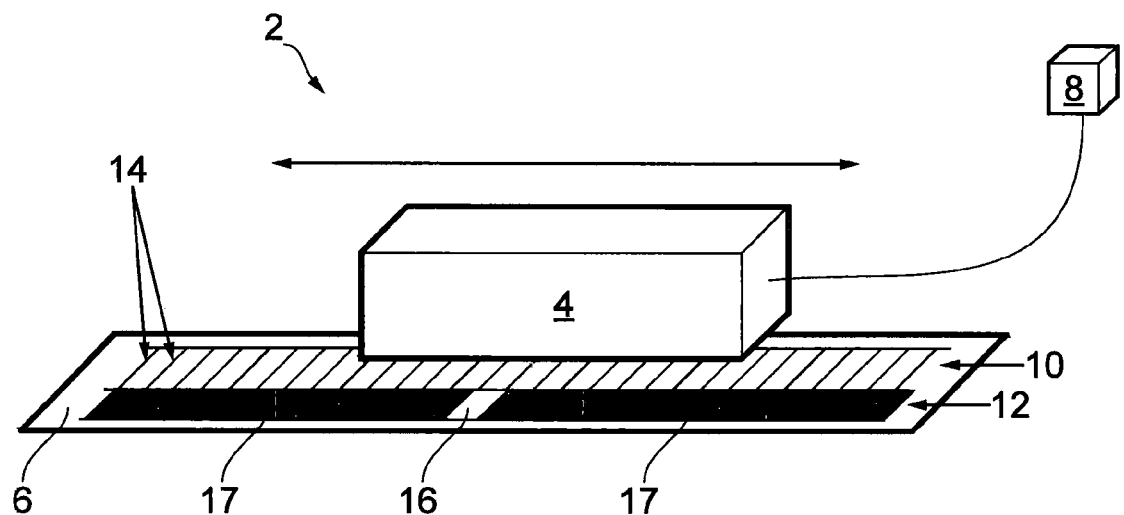
FIG. 1 is a schematic diagram illustrating an encoder apparatus according to the present invention.
Figure 2:
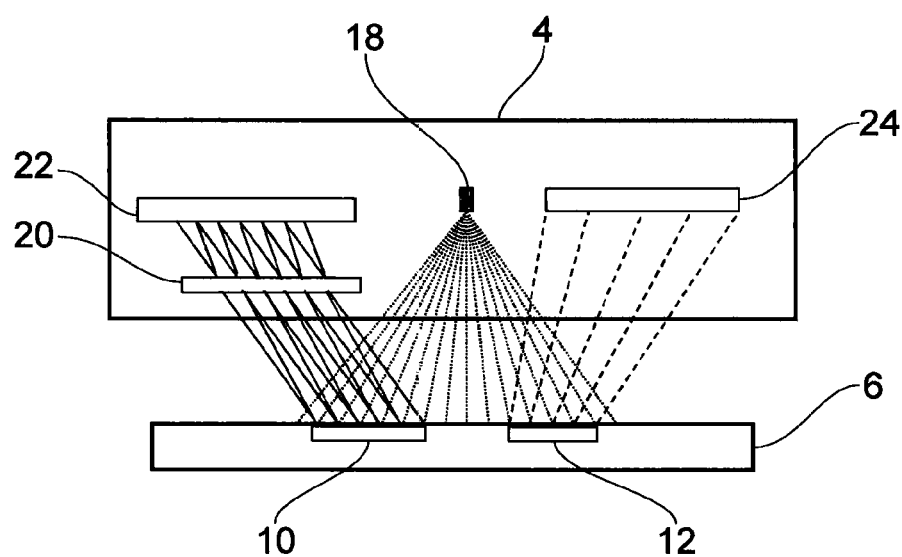
FIG. 2 schematically illustrates the optical scheme of the encoder apparatus of FIG. 1.

With reference to FIGS. 1 and 2 there is shown a first example encoder apparatus 2 according to the present invention. The encoder apparatus comprises a readhead 4 and a scale 6. Although not shown, in use the readhead 4 can be fastened to one part of a machine and the scale 6 to another part of the machine which are movable relative to each other. The readhead 4 is used to measure the relative position of itself and the scale 6 and hence can be used to provide a measure of the relative position of the two movable parts of the machine. The readhead 4 communicates with a processor such as a controller 8 via a wired (as shown) and/or wireless communication channel. As will be understood, processors can include bespoke processors configured for the specific application (e.g. a field programmable gate array "FPGA") as well as more generic processors which can be programmed (e.g. via software) in accordance with the needs of the application in which it is used. The readhead 4 can report the signals from its detectors (described in more detail below) to the controller 8 which then processes them to determine position information and/or the readhead 4 can itself process the signals from its detectors and send position information to the controller 8. In another embodiment, an intermediate unit, e.g. an interface unit, can be located between the readhead 4 and the controller 8. The interface unit can facilitate communication between the readhead 4 and controller 8. For example, the interface unit could be configured to process readhead signals and provide position information to the controller 8.

The scale 6 comprises a plurality of scale markings defining an incremental track 10. In the embodiment described, the scale 6 also comprises a reference track 12.

In this embodiment, the encoder apparatus is an optical, diffraction based encoder. Accordingly, the incremental track 10 comprises a series of periodic scale marks 14 which form a diffraction grating. The incremental track 10 could be what is commonly referred to as an amplitude scale or a phase scale. As will be understood, if it is an amplitude scale then the features are configured to control the amplitude of light transmitted toward the readhead's incremental detector (e.g. by selectively absorbing, scattering and/or reflecting the light), whereas if it is a phase scale then the features are configured to control the phase of light transmitted toward the readhead's incremental detector (e.g. by retarding the phase of the light). In the present embodiment, the incremental track 10 is an amplitude scale, but in either case, as explained in more detail below, the light interacts with the periodic scale marks 14 to generate diffracted orders.

The reference track 12 comprises a reference position defined by a reflective reference mark 16. The rest of the track comprises features 17 which absorb light. Accordingly, the reference position is defined by a mark which permits relatively more light to reach the reference mark photodetector 24 (described below) than the rest of the track in which it is contained, and in this case is relatively more reflective than the rest of the track in which it is contained. Reference positions can be useful to enable the readhead 4 to be able to determine exactly where it is relative to the scale 6. Accordingly, the incremental position can be counted from the reference position. Furthermore, such reference positions can be what are also referred to as "limit positions" in that they can be used to define the limits or ends of the scale 6 between which the readhead 4 is permitted to travel.

In this embodiment, the encoder apparatus is a reflective optical encoder in that it comprises an electromagnetic radiation (EMR) source 18, e.g. an infra-red light source 18, and at least one detector (described in more detail below) on the same side of the scale 6. In general, infra-red light from the light source 18 is configured to be reflected by the scale 6 back toward the readhead. As illustrated, the light source 18 is divergent and the light source's illumination footprint falls on both the incremental track 10 and the reference track 12. In the embodiment described, the light source 18 emits EMR in the infra-red range, however as will be understood, this need not necessarily be the case and could emit EMR in other ranges, for example anywhere in the infra-red to the ultra-violet. As will be understood, the choice of a suitable wavelength for the light source 18 can depend on many factors, including the availability of suitable gratings and detectors that work at the electromagnetic radiation (EMR) wavelength. As also illustrated, the readhead 4 also comprises a diffraction grating 20 (hereinafter referred to as "index grating" 20), an incremental photodetector 22 and a reference photodetector 24.

As shown in FIG. 2, the light source 18 is positioned between the incremental photodetector 22 and the reference photodetector 24, in a direction transverse to the reading direction of the readhead. This facilitates even illumination of both the incremental track 10 and reference mark track 12.

Light from the light source 18 is emitted from the readhead 4 toward the scale 6, where part of the light source's 18 footprint interacts with the reference track 12 and part of the light source's footprint interacts with the incremental track 10. In the currently described embodiment, the reference position is defined by a feature 16 in the reference mark track 12 which modifies the amount of light from the light source 18 that is reflected back toward the reference photodetector 24 compared to the rest of the track in which the reference mark is contained. This could be achieved, for example, by the features 17 in the rest of the reference mark track 12 absorbing, transmitting and/or scattering more light than the reference mark 16. In the position illustrated in FIG. 2, the readhead 4 is aligned with the reference position and so the light is shown as being reflected back toward the reference photodetector 24.

With respect to the incremental track 10, light from the source 18 falls on the periodic scale marks 14 which define a diffraction grating. The light therefore diffracts into multiple orders, which then fall onto the index grating 20 in the readhead 4. In the present embodiment, the index grating 20 is a phase grating. The light is then further diffracted by the index grating 20 into orders which then interfere at the incremental photodetector 22 to form a resultant field, which in this example is an interference fringe 26.

Figure 3:
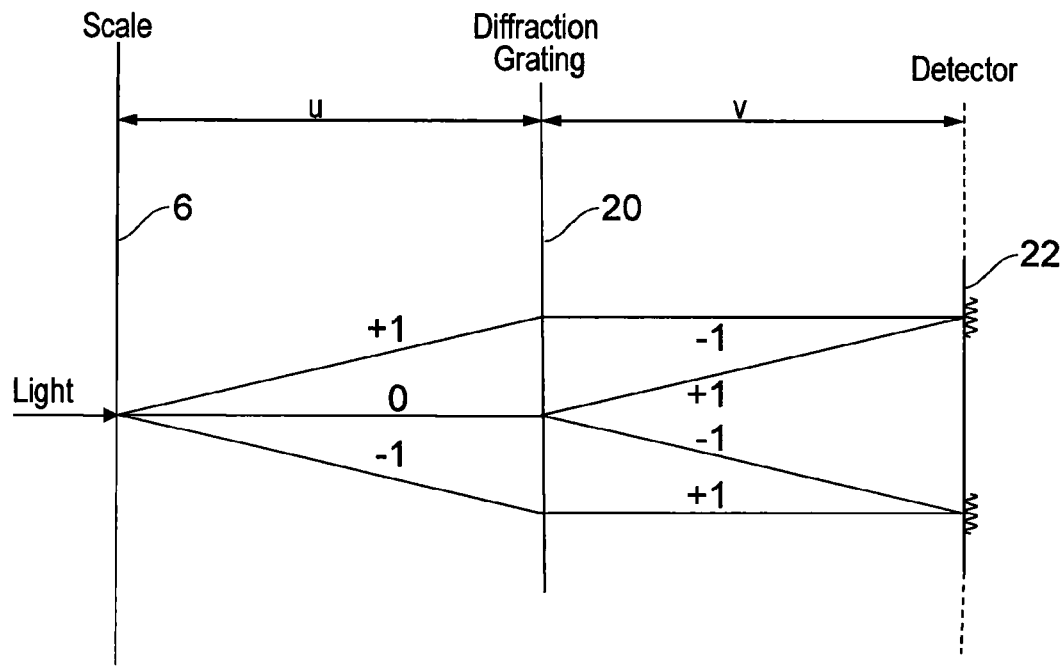
FIGS. 3 and 4 are schematic ray diagrams illustrating the generation of an interference fringe at the incremental photodetector via the use of diffracted light so as to facilitate incremental reading of the readhead position relative to the scale.
Figure 4:
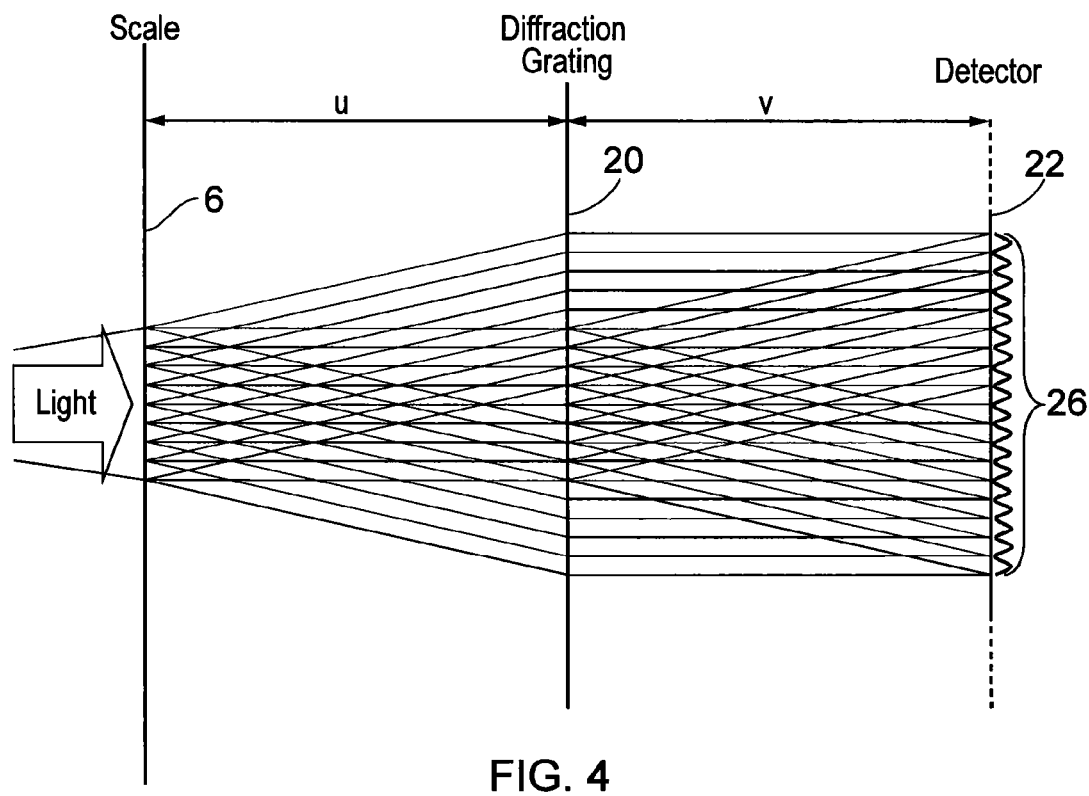

The generation of the interference fringe is explained in more detail with reference to FIGS. 3 and 4. As will be understood, FIG. 3 is a very simplified illustration of the actual optical situation encountered in an encoder apparatus. In particular, in FIG. 3 only one light ray from the source is illustrated whereas in fact an area of the incremental track 10 is illuminated by the source. Accordingly, in reality the optical situation shown in FIG. 3 is repeated many times over along the length of the scale (i.e. over the area that is illuminated by the source), hence producing a long interference pattern at the detector, which is schematically illustrated in FIG. 4. Also, for illustrative purposes only the $+/-1^{st}$ orders are shown (e.g. as will be understood the light will be diffracted into multiple orders, e.g. $+/-3^{rd}$, $+/-5^{th}$, etc diffraction orders). The light is diffracted by the series of periodic features 14 in the incremental track 10 of the scale 6, and the diffraction orders propagate toward the index grating 20 where the light is diffracted again before forming a resultant field 26 (in this case an interference fringe, but could for example be modulated spot(s)) at the incremental detector 22. As shown in FIG. 4, the resultant field 26 is produced by the recombination of diffracted orders of light from the index grating 20 and scale 6.

For the sake of simplicity of illustration the ray diagrams in FIGS. 3 and 4 are shown as transmissive ray diagrams (that is the light is shown as being transmitted through each of the scale and index grating), whereas in reality at least one of these could be reflective. For example, the rays could be reflected by the scale 6 as described above in connection with FIGS. 1 and 2.

The incremental detector 22 detects the interference fringe 26 to produce a signal which is output by the readhead 4 to an external device such as controller 8. In particular, relative movement of the readhead 4 and scale 6 causes movement of the interference fringes 26 relative to the incremental detector 22, the output of which can be processed to provide an incremental up/down count which enables an incremental measurement of displacement. As will be understood, typically encoders are configured to provide two signals in quadrature (that are 90 degrees out of phase from each other), and are commonly labelled as SIN and COS signals (even though they may not actually be sine or cosine signals). The quadrature signals can be interpolated to provide an accurate measurement of the position of the readhead to less than one period of the repeating scale pattern. The provision of such quadrature signals by an encoder apparatus is well known in order to provide an indication of direction as well as relative movement of the readhead and scale.

Figure 5:
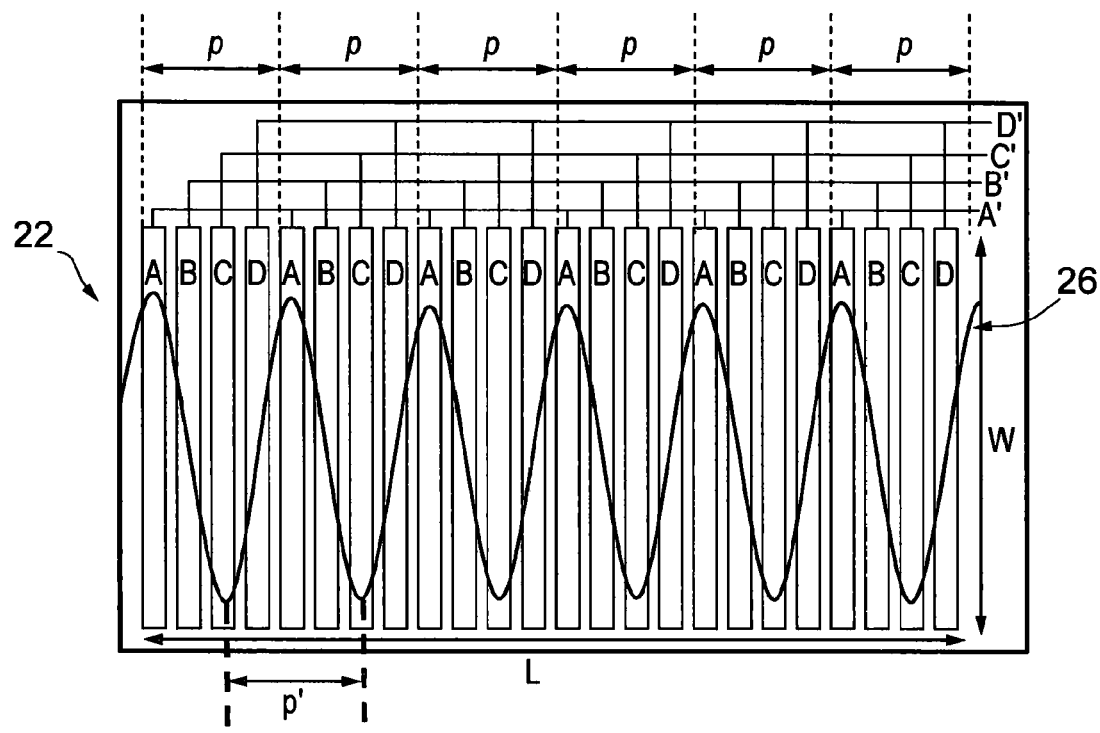
FIG. 5 is a schematic drawing of part of an electrograting suitable for use with the encoder apparatus of FIGS. 1 and 2, with the intensity variation of an example interference fringe superimposed thereon.

In the embodiment described, the incremental detector 22 is in the form of an electrograting, which in other words is a photo-sensor array which comprises two or more sets of interdigitated/interlaced/interleaved photo-sensitive sensor elements (also referred to herein as "photodetectors" or "fingers"). Each set can, for example, detect a different phase of the interference fringe 26 at the detector 22. An example of an electrograting is illustrated in FIG. 5, in which a part of an incremental detector 22 is shown, and in which the fingers/photodiodes of four sets of photodiodes (A, B, C and D) are interdigitated/interleaved to form an array of sensor elements extending along the length "L" of the sensor. The sets of photodiodes are arranged in a repeating arrangement, having a period "p" (and hence a frequency "f" being 1/"p").

As shown, in the embodiment described, the individual fingers/photodiodes/sensor elements extend substantially perpendicular to the length L of the incremental detector 22. Also, the individual fingers/photodiodes/sensor elements are substantially rectangular in shape. As will be understood, the invention is also applicable to other shaped and arranged sensor elements.

The output from each finger/photodiode in a set is combined to provide a single output, thereby resulting in four channel outputs: A', B', C' and D'. These outputs are then used to obtain the quadrature signals SIN and COS. In particular, A'-C' is used to provide a first signal (SIN) and B'-D' is used to provide a second signal (COS) which is 90 degrees out of phase from the first signal. Although in the specific embodiment the electrograting comprises four sets of photodiodes providing four the channels A', B', C' and D', this need not necessarily be the case. For example, the electrograting could comprise two sets of photodiodes providing just two channels A' and B'. Furthermore, in this embodiment, the incremental detector 22 is non-aliased. However, as will be understood, the invention is equally applicable to aliased sensors (e.g. sensors in which the distance between the sensor elements in each set is greater than one fringe period).

In FIG. 5, the interference fringe 26 is represented by a line which schematically illustrates the varying intensity of an ideal interference fringe across the incremental detector 22. As illustrated, the encoder apparatus is configured such that at any one instant in time all the photodiodes in any one set detect the same phase of the interference fringe (if the fringe period p', and sensor period p are the same).

FIG. 5 shows an ideal scenario in which the interference fringe has a purely sinusoidally varying intensity and in which the fringe period p' matches the electrograting period "p" (e.g. the period of the centres of two like photodiodes, such as two "A" photodiodes), thereby providing an integer number of repeats of the periodic pattern of the interference fringe per channel). In other words, the spatial frequency of the interference fringe (e.g. 1/p') is an integer multiple of the spatial frequency of the repeat of the sets of photodiodes (e.g. 1/p) (and in particular, in this case the spatial frequency of the interference fringe is equal to the spatial frequency of the repeat of the sets of photodiodes).

Figure 6A:
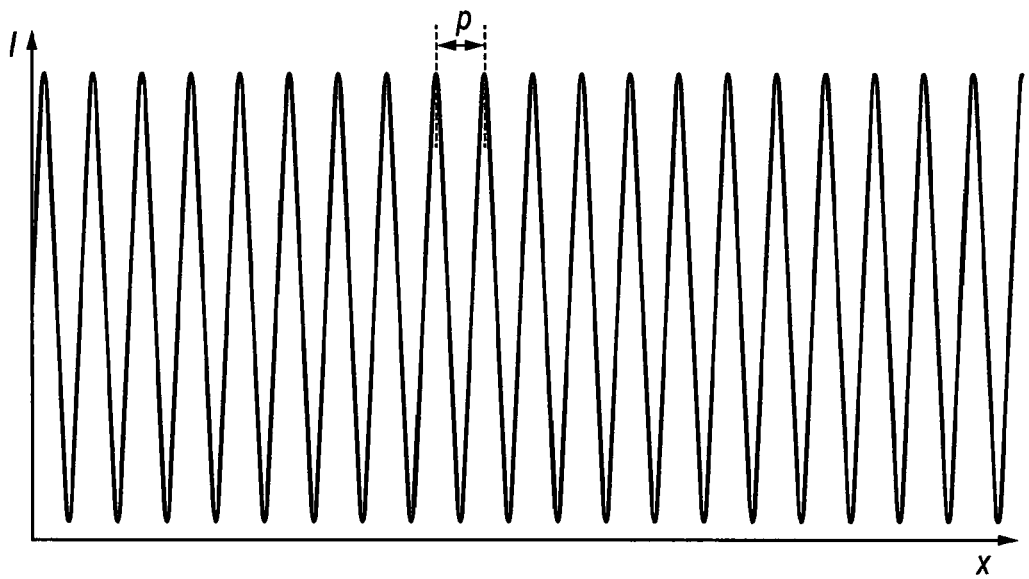
FIG. 6a is a graph illustrating the intensity variation of an interference fringe that can be obtained using an incoherent light source and the two grating arrangement of the encoder apparatus of FIGS. 1 to 5.
Figure 6B:
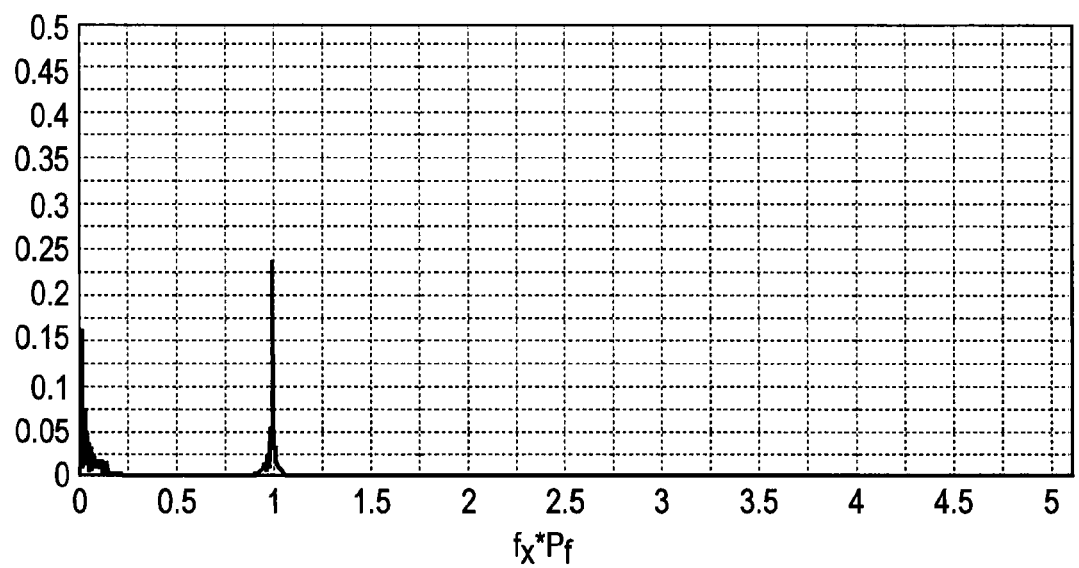

FIG. 6a schematically illustrates an intensity profile of an ideal interference fringe and FIG. 6b shows the Fourier Transform of such an interference fringe. As can be seen, the interference fringe predominantly comprises a fundamental frequency (sometimes referred to as the first harmonic) only. Typically, our inventors have striven for such an ideal interference fringe in order to achieve good performance from their encoder apparatus, in particular to avoid SDE which can be caused by an impure interference fringe.

However, our inventors have found that SDE that would otherwise be caused by impurities in an interference fringe falling on a sensor can be substantially reduced by appropriately configuring the encoder apparatus such that the output from the photodiodes/fingers are weighted such that the influence of the output from photodiodes/fingers on the determined position progressively decreases towards the ends of the sensor. This has been found to be so effective, that it enables the use of optical schemes which would result in an interference fringe which, without the use of such weighting, would provide an unacceptable position measurement signal.

Figure 7A:
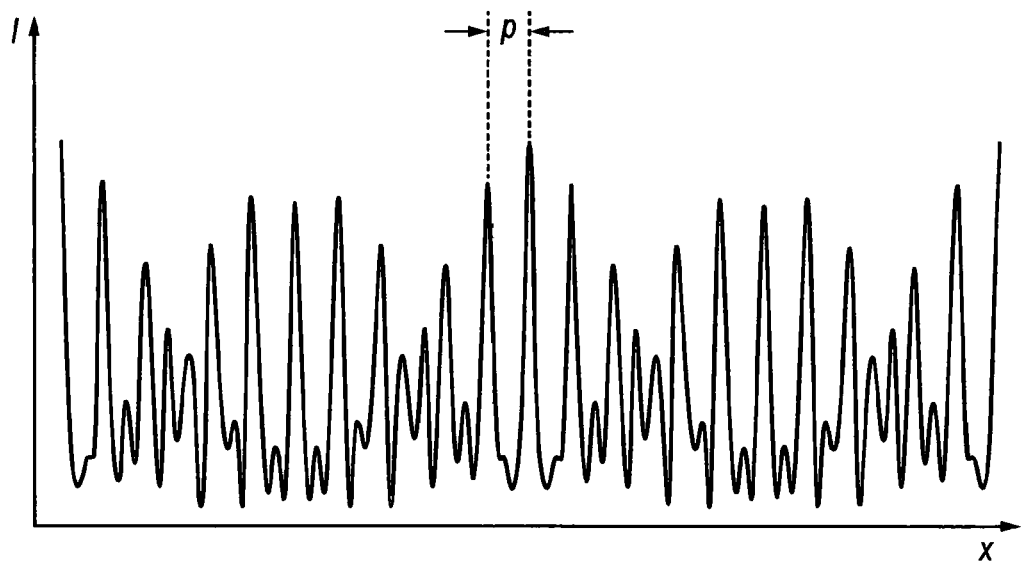
FIGS. 7a and 7b respectively illustrate the intensity variation of an interference fringe generated obtained by replacing the incoherent light source with a coherent light source, and the Fourier Transform thereof.
Figure 7B:
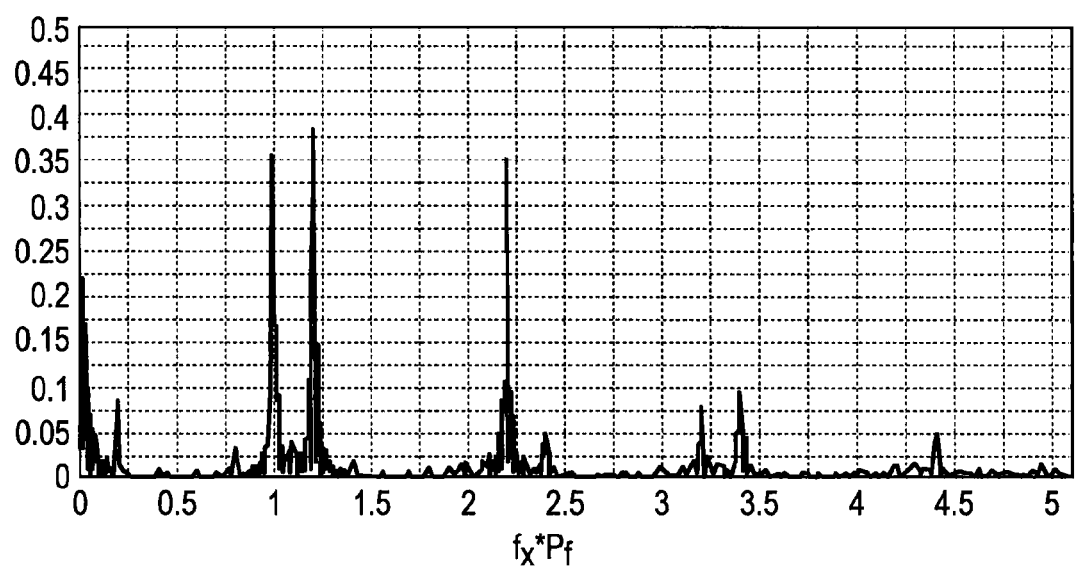

For example, our inventors have in the past used low-coherence light sources, e.g. light emitting diodes (LEDs) to optimise the purity of the interference fringe, but have found that other types of light sources such as a Surface Emitting Laser (SEL) for example a Vertical Cavity Surface Emitting Laser (VCSEL) can be beneficial because of improved system efficiency. However, these types of light source are more coherent than the traditional light sources used, and it has been found that the use of more coherent light sources can have a dramatic adverse effect on the interference fringe generated. For example, FIG. 7a schematically illustrates the intensity profile of the interference fringe falling on the sensor of the readhead of the present invention which comprises a coherent (in particular a VCSEL) light source. FIG. 7b shows the Fourier Transform of such an interference fringe, from which it can be seen that in addition to having a substantial amount of fundamental frequency, the interference fringe is also made up of other frequencies having significant magnitude. In particular, the interference fringe contains significant non-harmonic components. For example, as shown in FIG. 7b, relative to the fundamental frequency there is significant magnitude at the 1.2 multiple of the fundamental (as well as at other non-integer multiples of the fundamental frequency). As will be understood, the present invention is also applicable to other types of systems, including those which use more traditional low-coherence light sources such as LEDs. This is because the present invention can help to reduce the adverse effect of undesirable frequencies caused by other factors, and for example can help to improve the dirt immunity and/or the rideheight tolerance of the encoder system.

Figure 8:
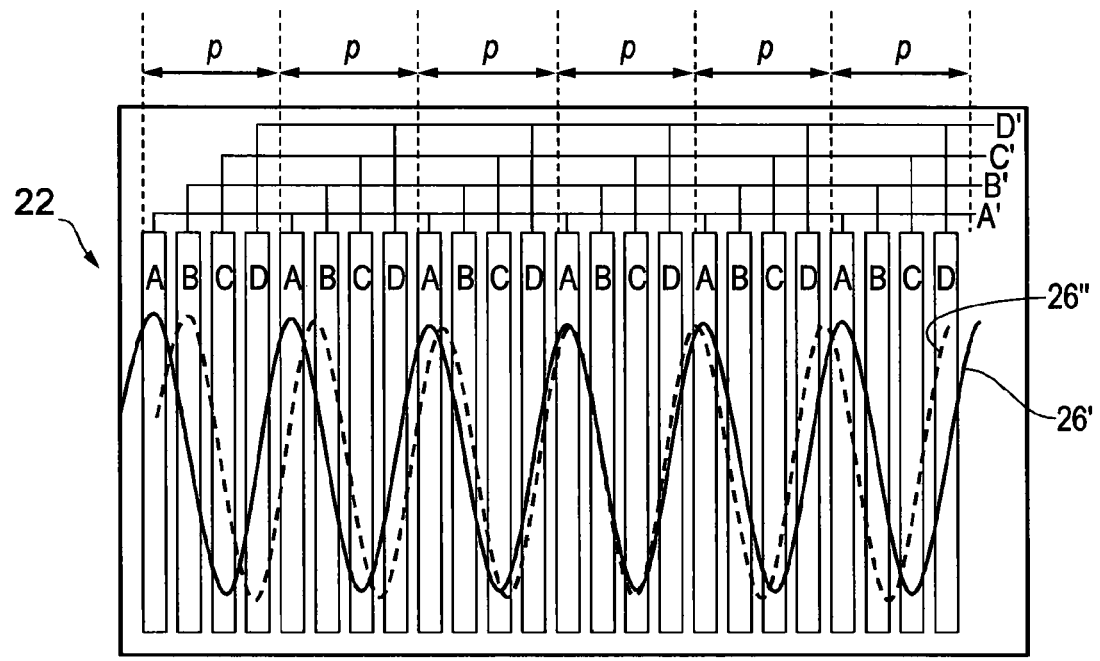
FIG. 8 is a schematic drawing of part of an electrograting suitable for use with the encoder apparatus of FIGS. 1 and 2, with the intensity variation of component parts of an interference fringe containing partial harmonics superimposed thereon.

FIG. 8 schematically illustrates the fundamental frequency component 26' of the interference fringe of FIG. 7a along with the 1.2 multiple frequency component 26". As illustrated, the component 26" that is a 1.2 multiple of the fundamental no longer has a spatial frequency matching the spatial frequency (e.g. 1/"p") of the repeating sets of photodiodes (A, B, C, D) of the electrograting 22, which in this particular example also results in a non-integer number of cycles of this component frequency of the interference fringe across the extent of the electrograting.

Such non-harmonic frequency components cause substantial SDE which adversely affects the measurement performance of the encoder apparatus. SDE is also caused when the fundamental frequency is a non-integer multiple of the frequency of the repeating sets of interdigitated photodiodes. For example, SDE can result even if the fringe is substantially sinusoidally pure (and so substantially does not comprise any non-integer multiple components of the fundamental frequency), but in which the frequency of the sinusoidal signal (its fundamental period) is a non-integer multiple of the frequency of the repeating sets of interdigitated photodiodes. In this case, the weighting of the invention can reduce the adverse effect of such the mismatch between the fundamental period of the signal and the repeat of the incremental detector's sets of interdigitated photodiodes. (This is explained in more detail below in connection with FIG. 15). Accordingly, the invention has benefit when at least a component frequency of the scale signal, and for example when the fundamental frequency of the scale signal, is a non-integer multiple of the frequency of the repeating sets of interdigitated photodiodes.

Figure 9:
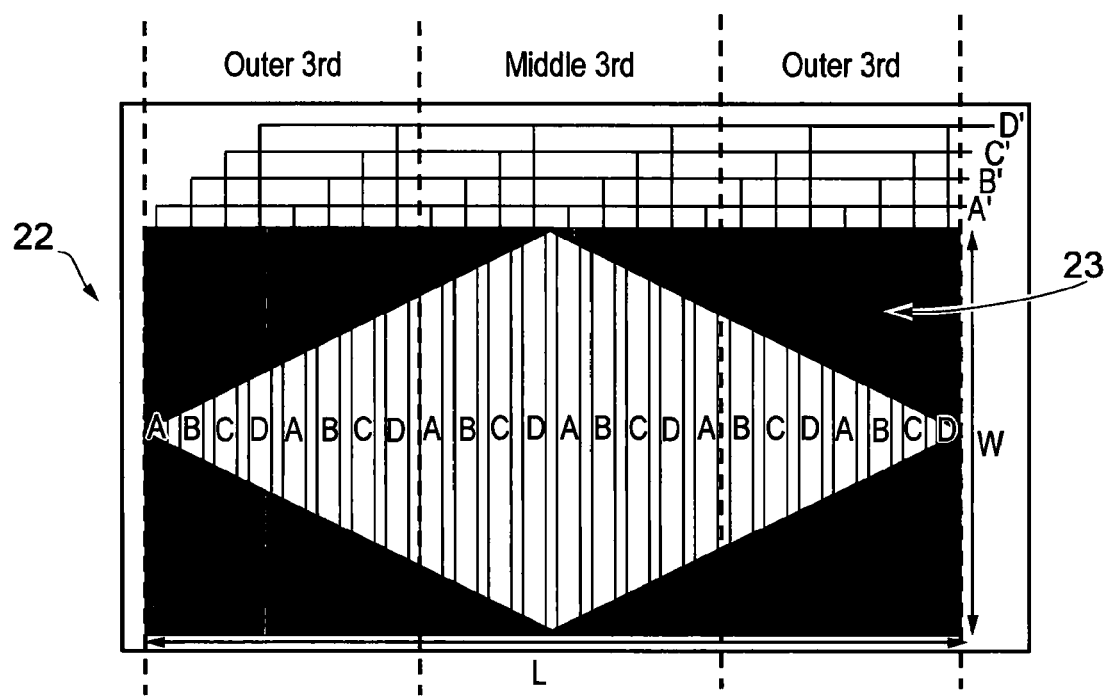
FIG. 9 schematically illustrates an example electrograting according the present invention.

Our inventors have found that weighting the output of the electrograting's photodiodes can substantially reduce the sub-divisional error due to imperfections in the scale signal (e.g. as explained above when at least a component spatial frequency of the scale signal, and for example when the fundamental spatial frequency of the scale signal, is a non-integer multiple of the spatial frequency "1/p" of the repeating sets of interdigitated photodiodes, or due to the presence of a non-integer number of cycles over the extent of the sensor of at least a component frequency of the scale signal). There are numerous ways in which this could be done. For example, an opaque (e.g. metallisation) layer 23 could be applied over the electrograting so as to partially block the photodiodes/fingers, in a way in which the degree of blocking increases towards the ends of the electrograting (such that the effective width "W" of the sensor predominantly decreases towards the ends of the incremental detector 22). Such a layer could, for example, absorb, scatter and/or reflect the light so as to prevent it reaching the sensor elements for example. FIG. 9 illustrates one such configuration and FIG. 10 relates to the configuration shown in FIG. 9. In particular, the top graph (A) of FIG. 10 illustrates how, starting from the middle of the electrograting, the effective sensing area of the photodiodes of each channel progressively decreases towards the ends of the electrograting. As shown, the effective sensing area of the incremental detector 22 is at a peak toward the middle of the electrograting and progressively reduces towards the ends of the electrograting. In other words, the effective width "W" of the sensor decreases towards the ends of the incremental detector 22. In particular, as such if the sensor is notionally divided into thirds, the opaque layer 23 is configured such that the middle third of the incremental detector 22 is covered substantially less than the outer thirds of the sensor. Accordingly, the middle third of the incremental detector 22 will have a substantially greater influence on the determined relative position than the outer thirds of the incremental detector 22.

In this particular configuration the weighting is substantially triangular in shape. Such an opaque layer 23 effectively makes the incremental detector 22, and in particular the photodiodes, progressively smaller towards the ends of the photodiode array, such that the electrograting's photodiodes have a progressively decreasing contribution to and influence on the signal used to determine the relative position of the scale and readhead. In particular, as a result of said masking, the magnitude of the signals from those fingers/photodiodes towards the end of the array will be less than the magnitude of the signals from those fingers/photodiodes towards the middle of the array. Accordingly, the output from those fingers/photodiodes towards the end of the array have a smaller influence on the resultant quadrature signals SIN and COS.

The bottom graph (B) of FIG. 10 illustrates the Modulation Transfer Function (MTF) of the A-C channels (which is the same as B-D channels) of such an electrograting 22. As shown, the electrograting is highly and most sensitive to the fundamental frequency, but as can be seen (especially when compared to the MTF of a regular, rectangular, non-weighted electrograting; see FIG. 11), the electrograting has substantially reduced sensitivity to non-harmonic frequency components. Accordingly, due to such weighting, the electrograting is significantly less sensitive to the presence of such non-harmonic frequency components in the interference fringe falling on the electrograting, compared with a standard electrograting such as that illustrated by FIG. 11. The inserts (C) on the bottom graphs of FIGS. 10 and 11 show a magnified view of the electrograting's MTF around the fundamental frequency; as can be seen, the side-lobes around the fundamental frequency are substantially reduced by weighting the electrograting's photodiode outputs.

By reducing the electrograting's sensitivity to such non-harmonic frequencies, the electrograting 22 passes through a purer signal to subsequent position determining electronics, resulting in the encoder apparatus' SDE being substantially reduced. In particular, such weighting can improve the purity of the quadrature signals provided by the encoder apparatus, e.g. such that they comprise purer sine and cosine signals.

Figure 12:
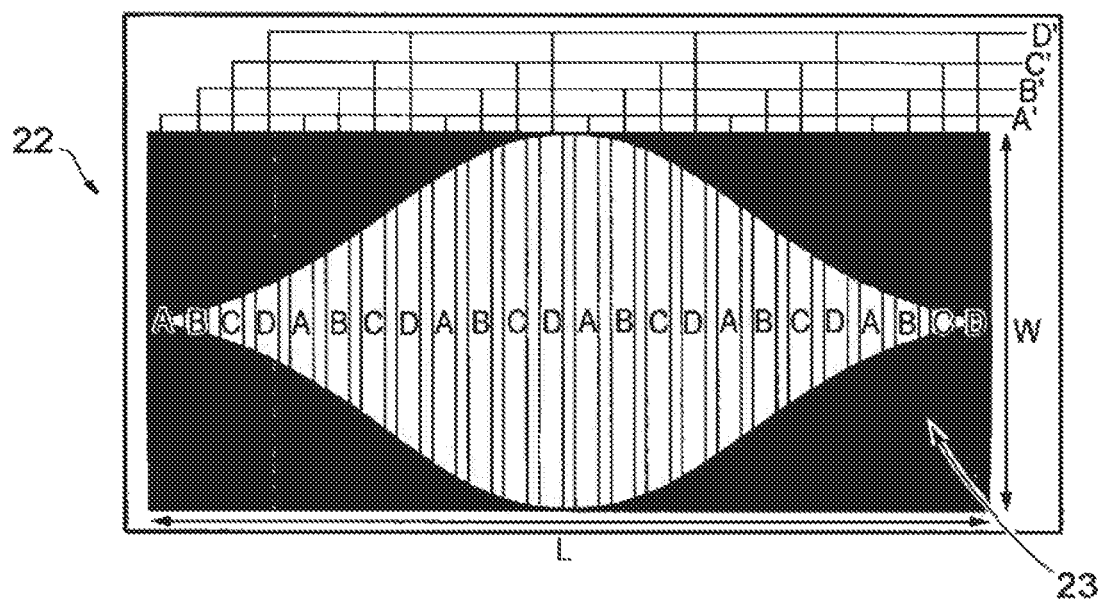
FIG. 12 schematically illustrates an example electrograting according another embodiment of the present invention.
Figure 13:
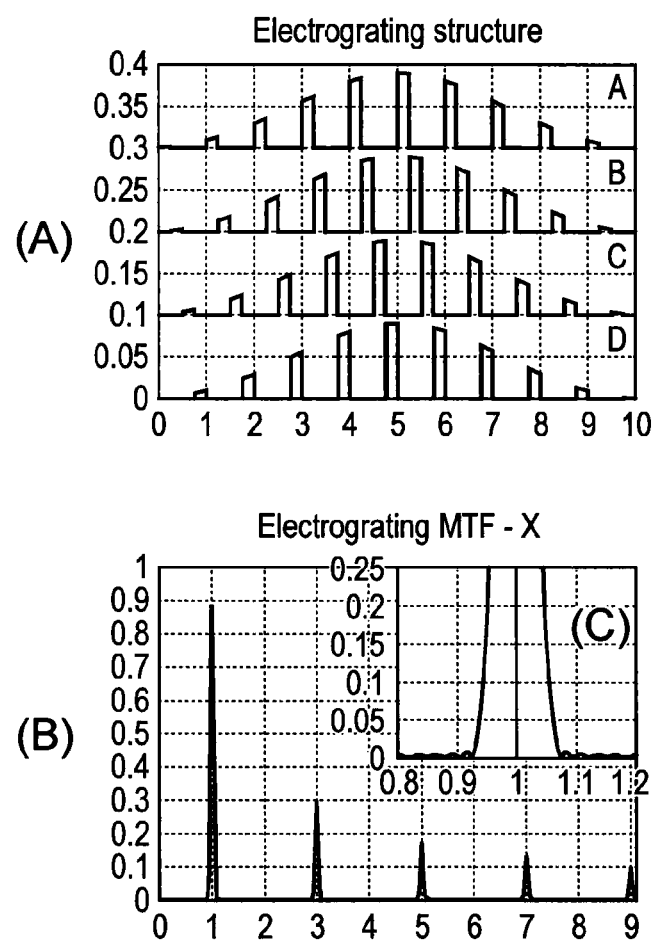
FIG. 13 comprises two graphs, respectively illustrating the electrograting structure of the electrograting of FIG. 12, along with the Modulation Transfer Function (MTF) of the electrograting of FIG. 12.

FIGS. 12 and 13 illustrate another configuration in which again the electrograting 22 is masked so as to increasingly block the photodiodes towards the ends of the electrograting 22, such that the effective width "W" of the sensor decreases towards the ends of the incremental detector 22. In contrast to the embodiment of FIGS. 9 and 10, this time the increase in the extent of blocking is non-linear. As shown in FIGS. 12 and 13, the rate at which the photodiodes are blocked varies. In particular, the gradient of the window/weighting (in this case the rate at which the photodiodes are increasingly blocked) is relatively shallow at and near the middle of the electrograting (indeed, there could be zero gradient at one point at/near the middle), then increases with distance away from the middle of the electrograting before becoming shallow again near the ends of the electrograting. Such a shape could be described as being bell-shaped. In this particular example, the masking of the photodiodes as shown in FIGS. 12 and 13 is configured such that the output of the electrograting's photodiodes are weighted according to a Kaiser window function which, as shown, has an even greater effect on reducing the sensitivity of the electrograting to non-harmonic frequency components (e.g. compared to the linear/triangular weighting of FIGS. 9 and 10), and thereby substantially eliminates the encoder's SDE that would otherwise be caused by a non-integer number of cycles over the extent of the sensor of at least a component frequency of the interference fringe falling on the sensor. In FIG. 12, the different channels of the electrograting are represented by different shades rather than via labels A, B, C, D. As will be understood, numerous known window functions could be used, including for example, Hann, Hamming, Welch, Chebyshev, Cosine, Slepian, Gaussian, Lanczos, Parzen, Blackman, Nuttall, Tukey, Kaiser and any hybrid of these.

Figure 15:
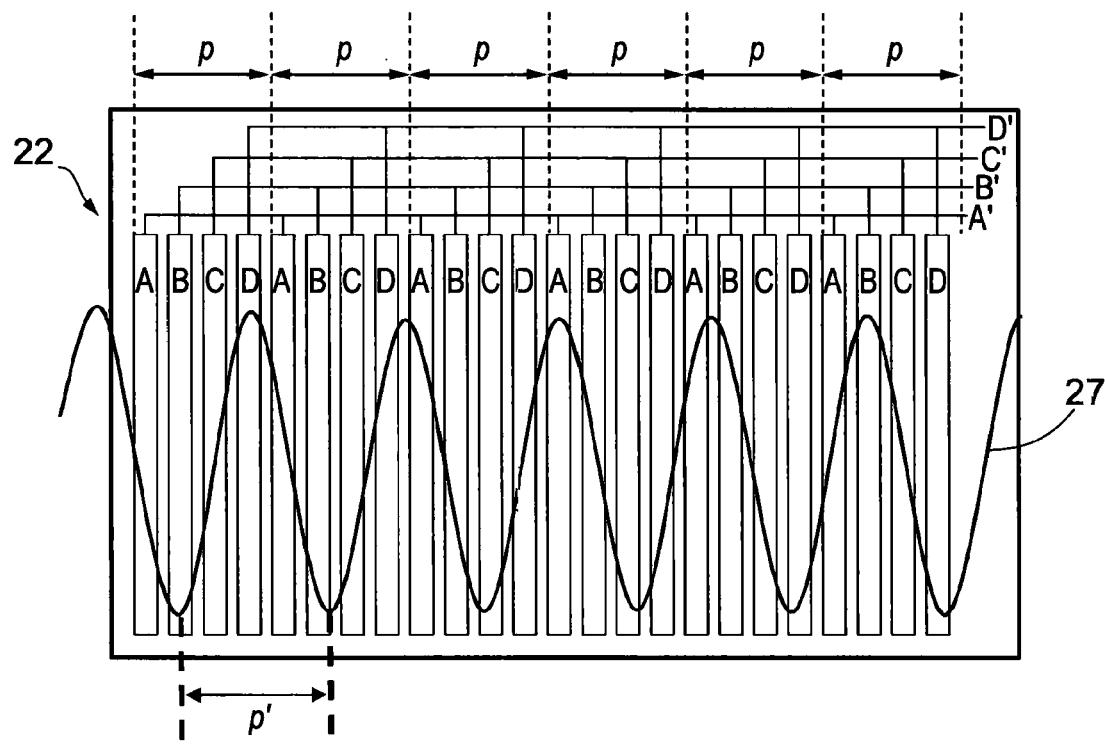
FIG. 15 is a schematic drawing of part of an electrograting suitable for use with the encoder apparatus of FIGS. 1 and 2, with the intensity variation of an interference fringe that has been stretched (e.g. due to fringe and sensor period mismatch) superimposed thereon.

The above describes how the configuration according to the present invention can help to substantially reduce an encoder apparatus' SDE caused by the presence of non-harmonic frequency components in the interference fringe, e.g. caused by the use of a coherent/monochromatic light source. However, our inventors have found that the configuration of the invention can also beneficially reduce the SDE caused by other factors. For instance, even when an incoherent light source is used and an interference fringe having a pure sinusoidally varying intensity falls on the sensor, the interference fringe could be subject to fringe and sensor/period mismatch (e.g. stretching/shrinking of the period of the fringe due to changes in ride-height). For example, as illustrated in FIG. 15, due to fringe and sensor period mismatch the interference fringe falling on the electrograting has become stretched (compared to the interference fringe illustrated in FIG. 5) such that there is now no longer an integer number of repeats of the sinusoidally varying intensity. In particular, as illustrated by FIG. 15, such stretching of the interference fringe leads to the interference fringe being increasingly out-of-phase with respect to the electrograting's channels. In particular, the spatial frequency of the sinusoidal signal (1/p') is now a non-integer multiple of the spatial frequency of the repeating sets of interdigitated photodiodes (1/p). This disrupts the purity of the quadrature signals generated by the readhead, thereby leading to significant SDE. However, configuring the encoder apparatus such that the sensor elements' outputs that are used to determine the position of the scale and readhead are weighted such that the influence of the output from sensor elements on the determined position progressively decreases towards the ends of the sensor 22 makes the electrograting less sensitive to the fringe becoming increasing out-of-phase with respect to the electrograting toward the ends of the electrograting, and thereby substantially improves the phase relationship of the quadrature SIN and COS signals, which in turn substantially reduces the encoder apparatus' SDE.

Furthermore, the configuration of the invention has been found to be beneficial in other types of position measurement encoders. For example, the configuration of the invention has been found to be beneficial with an absolute encoder apparatus. For example, WO2010/139964 describes how a fine position (e.g. a position to a resolution finer than the period of the scale's features) can be determined from an image of a scale comprising features defining a series of unique absolute positions. In summary, this involves finding the phase offset of the imaged scale markings, by finding the dot product of the signal output by the readhead's sensor with reference SINE and COSINE waves. The process of WO2010/139964 is used in the absolute encoder branded RESOLUTE™ by Renishaw plc. In that product, coefficients of the reference SINE and COSINE waves, weighted according to a Hann window function, are pre-stored in look-up tables. The dot product of the unweighted outputs of the sensor elements and said reference SINE and COSINE waves is calculated to determine the phase offset. In contrast, our invention involves weighting the outputs of the sensor elements that are used in the dot product calculation. Accordingly, as with the above described embodiments, the invention could be incorporated into an absolute encoder by progressively restricting the strength/magnitude/power of the signal that the sensor can detect towards the ends of the sensor (e.g. by shaping/sizing the sensor elements or by masking regions of the image sensor such that its effective sensing width decreases towards the ends of the image sensor) such that the outputs from the pixels are weighted in accordance with the invention. As described in WO2010/

139964 the image obtained from the scale can be processed in two stages/using two techniques to determine both a coarse absolute position and a fine position. Progressively restricting the strength/magnitude/power of the signal that the sensor can detect towards the ends of the sensor (e.g. by shaping/sizing the sensor elements or by masking regions of the image sensor) might be beneficial for the coarse and/or fine position determination.

Figure 20A:
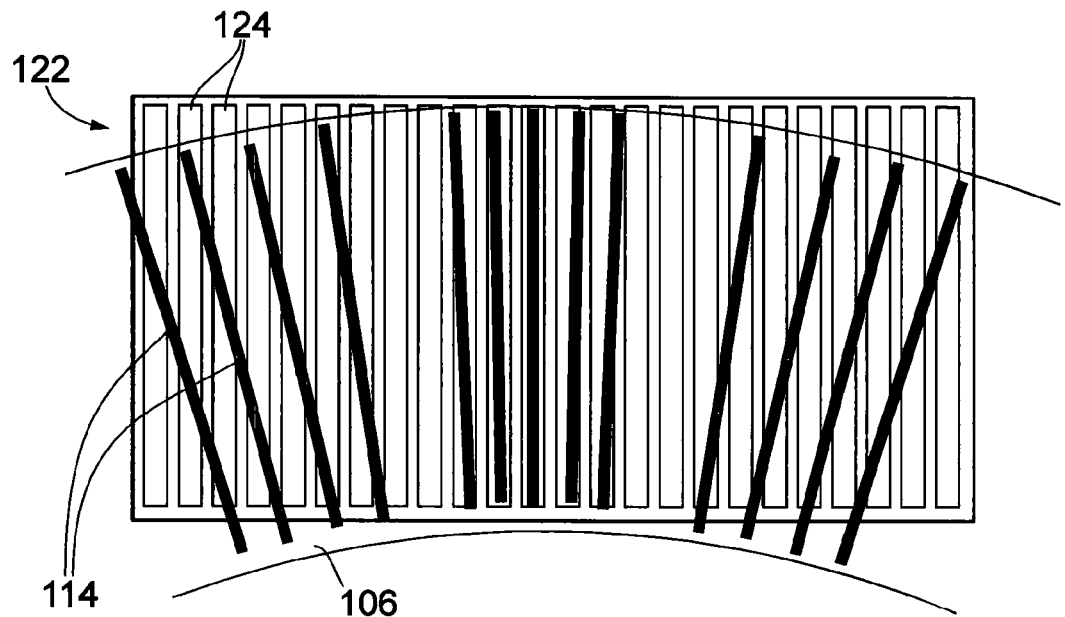
FIGS. 20(a) and 20(b) respectively illustrate an unmasked and a masked sensor for an absolute encoder on which a fanned absolute pattern falls.
Figure 20B:
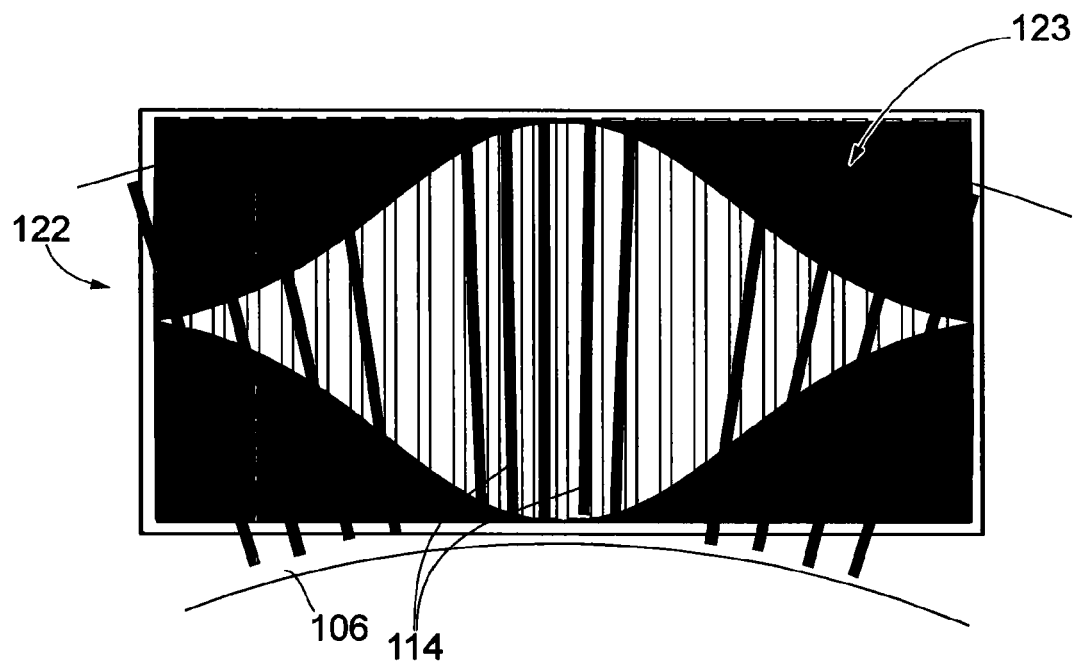

For instance, with reference to FIG. 20a there is schematically shown an unmasked sensor 122 for an absolute encoder comprising an array of equally shaped and sized sensor elements 124, and a disc scale 106 comprising a series of scale features 114 arranged in a pattern so as to define absolute code words which enable unique positions to be determined. As shown, because the scale features 114 are arranged on the face of the disc 106, they are fanned. This means that towards the ends of the sensor 122, the features 114 cross multiple sensor elements 124. With regard to the coarse position determination, this can make it difficult to decode the codeword defined by the features 114. With regard to the fine position determination, undesirable frequencies which affect the accuracy of the determined fine position can be introduced by such fanning (and also due to other factors such as magnification error). FIG. 20b shows the same arrangement but configured such that the strength/magnitude/power of the signal that the sensor can detect towards the ends of the sensor is progressively restricted (in this case by making layer 123). As can be seen, such an arrangement reduces the adverse fanning effect on the coarse position determination since towards the ends of the sensor (where fanning is worst) the extent/effective lengths of the sensor elements are restricted such that it only sees a small part of the scale features 114 and hence crosses fewer sensor elements. As will be understood, such fanning can also be an issue with incremental systems. Weighting according to the invention can also help to suppress the adverse effect of such fanning. As will also be understood, if the encoder system (absolute or incremental) is not concerned with interpolation (and hence SDE is not an issue) then as will be understood the weighting need not be configured so as to make the sensor less sensitive to undesirable frequencies which contribute to SDE. Accordingly, for example, the weightings need not necessarily suppress the side lobes of the spatial frequency response of the sensor. Accordingly, a wider variety of window shapes, including those comprising sharp edges, could be used.

With regard to FIG. 20(b), such weighting also reduces the adverse effect of undesirable frequencies in the signal which affect the accuracy of the determined fine position. Such weighting could be achieved in other ways, such as reducing the size of the sensor elements 124 towards the ends of the sensor such that the effective width "W" of the sensor 122 predominantly decreases towards its ends.

Alternatively, it might be desirable in some encoders not to progressively restrict the intensity of the signal that the sensor can detect towards the ends of the sensor (e.g. not to shape/size the sensor elements or mask the sensor). In some situations it might be considered, on balance, undesirable for the coarse position determination to weight the signal, but still be desirable to weight the signal for the fine position determination (since it can help to reduce the adverse effect of those undesirable frequencies which affect the accuracy of the determined fine position). Accordingly, it could be preferred to split the outputs of the sensor elements into first and second outputs, the first being used in a raw state to determine the coarse position, and the second being weighted before being used to determine the fine position. It might also be desirable not to progressively restrict the intensity of the signal that the sensor can detect towards the ends of the sensor in incremental type encoders, and as such it might be desirable instead to weight the signals by manipulating the outputs of the sensor elements instead (e.g. via one or more attenuators and/or amplifiers).

Figure 17:
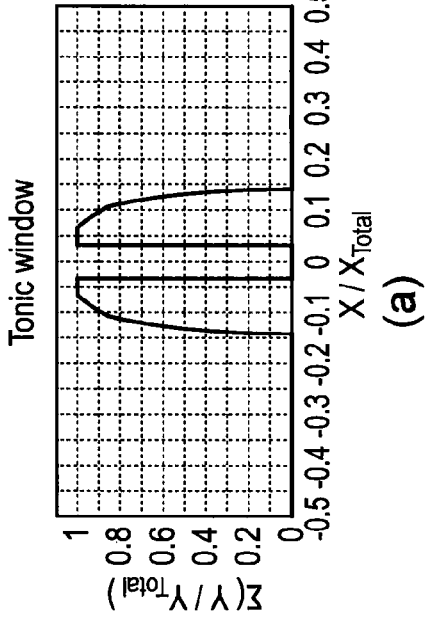
Figure 17:
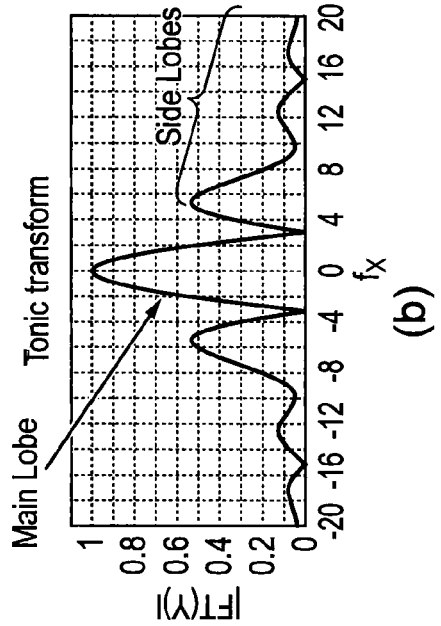
Figure 16:
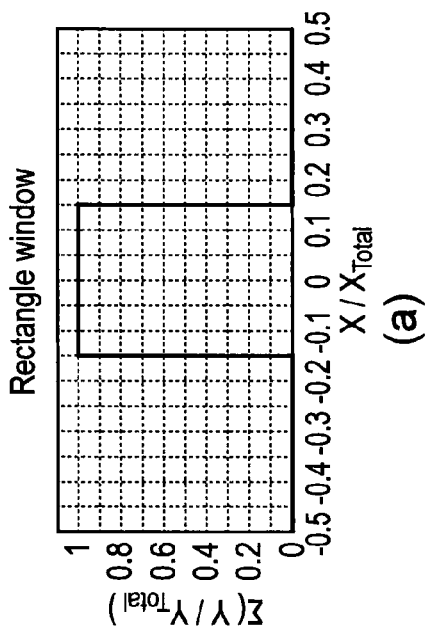
FIGS. 16(a) and (b) to FIGS. 19(a) and (b) illustrate various window shapes and their respective frequency response graph.
Figure 16:
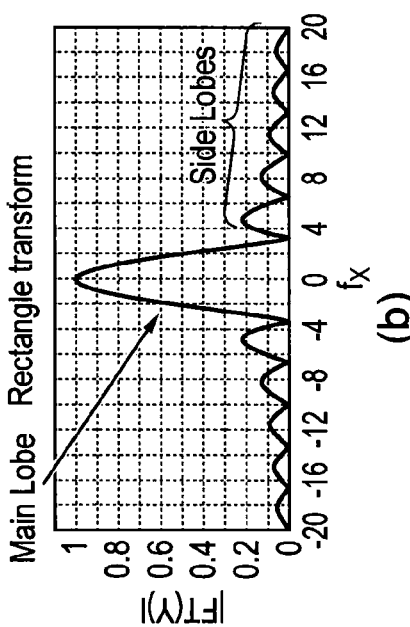

FIG. 16(a) illustrates the standard rectangular window shape typically employed in known readheads (as will be understood, some natural vignetting occurs in existing encoders (e.g. due to the light source), but has substantially no effect on reducing the adverse effect of undesirable frequencies, e.g. due to the extent and shape of the vignetting). As shown, in FIG. 16(b) the frequency response of such a sensor (obtained by a spatial Fourier Transform of the responsiveness of such a sensor) comprises a main lobe and a plurality of side lobes. FIGS. 17(a) and (b) similarly illustrate the sensor window shape and frequency response of another known encoder called TONiC™ which is available from Renishaw plc. The dip in the middle of the window shape is caused by the omission of a plurality of sensor elements in the array, due to a separate reference mark sensor being positioned within the sensor element array of the incremental detector. As shown in this design, the side lobes are even bigger than that of the standard rectangular window shape.

Figure 18:
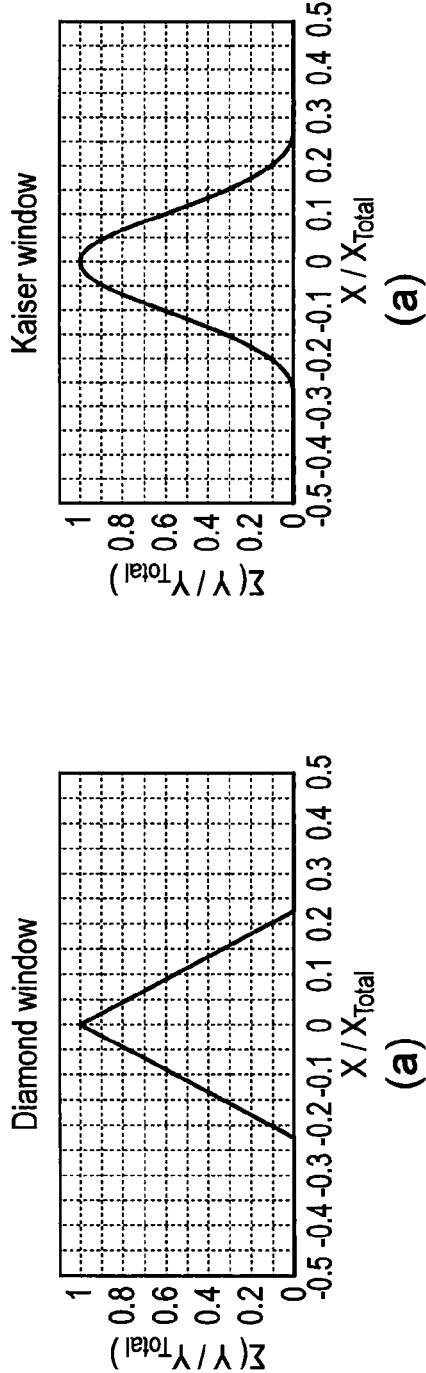
Figure 19:
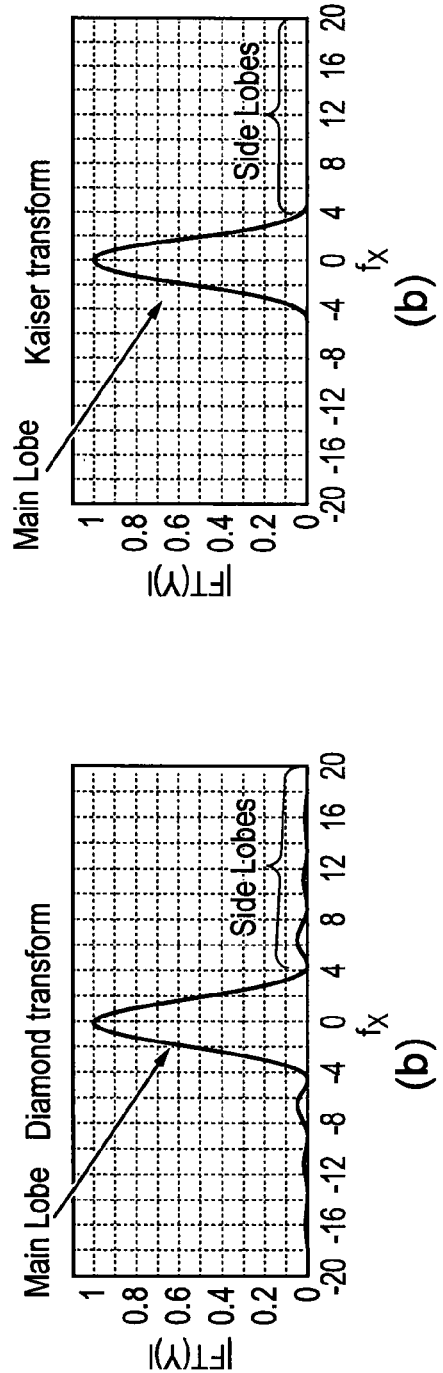

In contrast, FIGS. 18(a) and (b) and FIGS. 19(a) and (b) illustrate novel encoder sensor window shapes (diamond and Kaiser windows respectively), the frequency responses of which have substantially suppressed side lobes. Such shapes ensure that the sensor is substantially insensitive to those undesirable frequencies which contribute to SDE.

Figure 21:
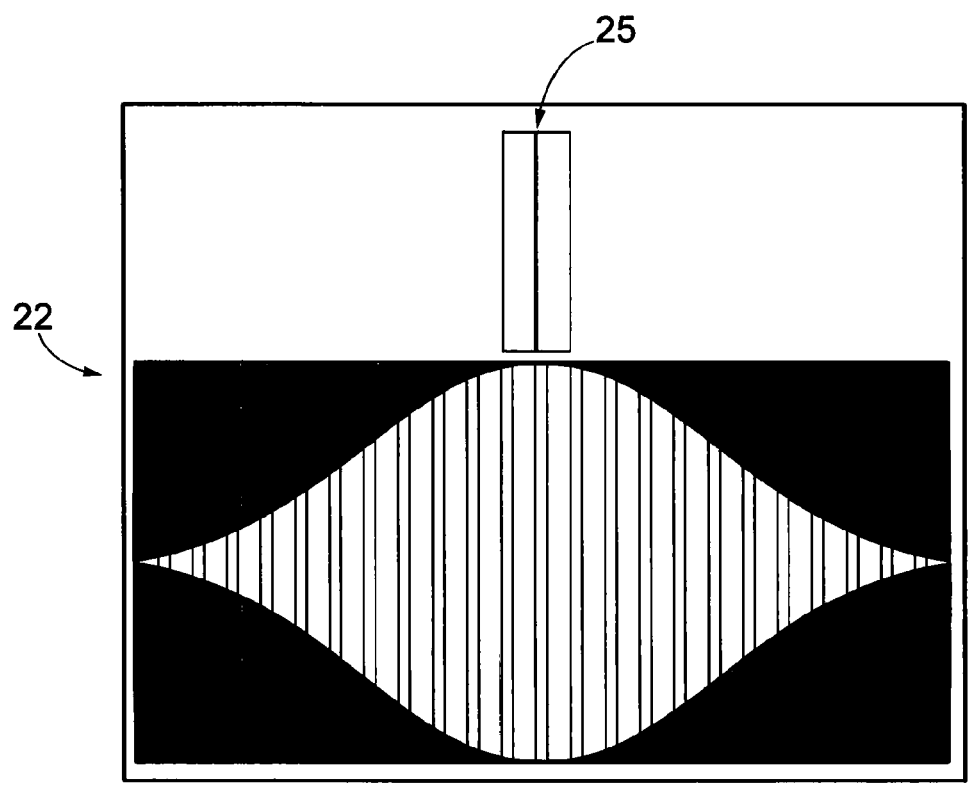
FIG. 21 illustrates an example arrangement of an incremental detector and reference mark detector.

FIG. 21 illustrates an example arrangement whereby a separate reference mark detector 25 (in this case a split detector comprising at least two, and for example three of four photodiodes) for detecting the reference mark 16 is provided adjacent the incremental detector 22 such that it is not positioned within the incremental detector. Accordingly, the reference mark detector is not positioned within the array of sensor elements of the incremental detector, but rather is to the side of the incremental detector. As will be understood, other arrangements are possible, for example the reference mark detector being provided separately at the end of the incremental detector.

Figure 14:
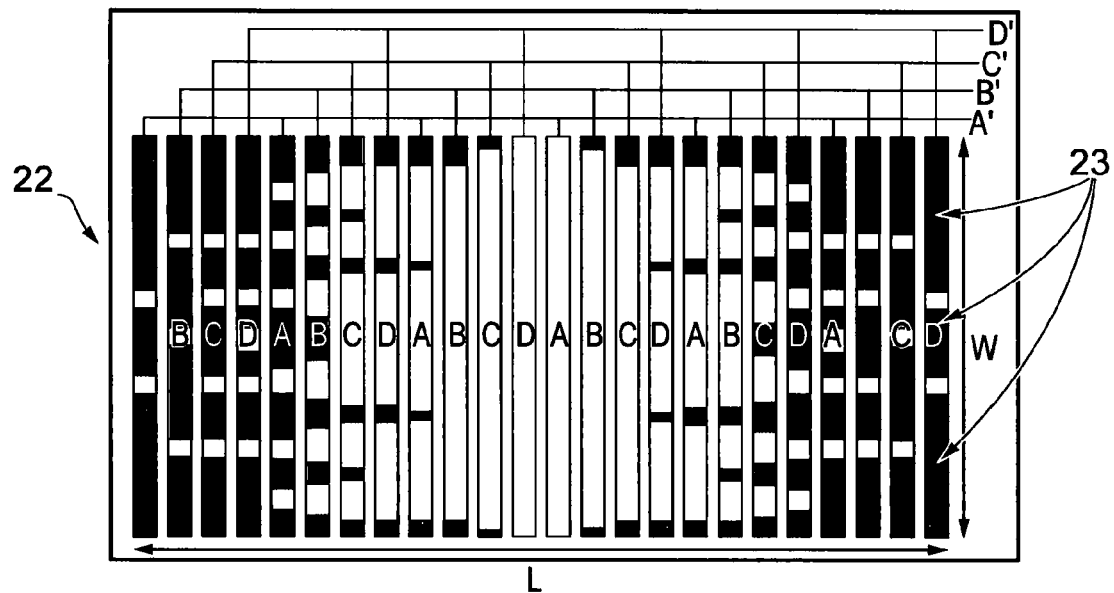
FIG. 14 schematically illustrates an example electrograting according to another embodiment of the present invention.

As described and shown above, in FIGS. 9 and 12, large areas of the electrograting are covered by a single continuous mask. However, this need not necessarily be the case and the same effect can be achieved by each photodiode comprising a plurality of individual masking features. Such an embodiment is schematically illustrated in FIG. 14, in which the level of masking increases towards the ends of the array such that the outputs are weighted according to a Kaiser window function. Accordingly, a graph of the electrograting structure for FIG. 14 would be the same as that shown in FIG. 13(a).

As will be understood, rather than applying a mask directly on the sensor, an appropriately shaped/configured mask could be provided a distance away from the sensor such that it casts a shadow onto the sensor, such that the photodiodes are progressively under a greater proportion of shadow towards the ends of the array. For example, in the embodiments described such a mask could be applied to the index grating 20.

Another alternative way of achieving such weighting includes using an illumination system/arrangement configured such that the footprint of light falling on the sensor is shaped and sized in a way that restricts light reaching the photodiodes so as to weight the outputs according to the invention (e.g. so that the photodiodes generally progressively receive less light towards the ends of the sensor).

A further alternative way of implementing the invention can comprise one or more signal manipulators configured to manipulate the outputs of the photodiodes so as to weight the outputs according to the invention. For example, one or more attenuators and/or one or more amplifiers can be used to suppress and/or amplify the photodiode's outputs. If necessary, one or more attenuators and/or one or more amplifiers can be provided for individual photodiodes. Such signal manipulators can be placed before subsequent electronics configured to process and/or combine outputs. For example, in an encoder apparatus comprising an electrograting, such signal manipulators can be configured to act before the outputs are combined to form a channel signal, e.g. A', B', C' or D'.

The above embodiments describe the sensors 22, 122 comprising a one-dimensional array of sensor elements. As will be understood, the sensors 22, 122 could comprise a two-dimensional array of sensing elements. If so, then the weighting could be achieved by using fewer pixels towards the ends of the sensor.

The invention claimed is:

1. An encoder apparatus comprising an incremental scale comprising at least one track comprising a series of generally periodically arranged features configured to diffract light, and a readhead comprising a sensor comprising an array of sensor elements for detecting a scale signal falling on the sensor which is used to determine the relative position of the scale and readhead, in which the scale signal comprises an interference fringe, in which the apparatus is configured such that the output of the sensor along a length of the sensor is weighted according to a window function that is configured to reduce the adverse effect of undesirable frequencies in the scale signal so as to thereby reduce the encoder apparatus' sub-divisional error, in which the weighting is configured such that an influence of a sensor output on the determined relative position predominantly decreases towards the ends of the sensor.

2. The encoder apparatus as claimed in claim 1, in which the weighting according to the window function is configured to suppress the side lobes of the spatial frequency response of the sensor.

3. The encoder apparatus as claimed in claim 1, in which the magnitude of at least the primary side lobe of the sensor's spatial frequency response is not more than 10% of the magnitude of the main lobe of the sensor's spatial frequency response.

4. The encoder apparatus as claimed in claim 1, in which the weighting is configured such that the influence of the output from the sensor on the determined relative position generally progressively decreases towards the ends of the sensor.

5. The encoder apparatus as claimed in claim 1, in which the influence of the sensor output on the determined relative position is substantially greater at the middle third of the sensor than at the outer thirds of the sensor.

6. The encoder apparatus as claimed in claim 1, configured such that the influence of the sensor towards the ends of the sensor is at most 25% of the influence of the sensor towards the middle of the sensor.

7. The encoder apparatus as claimed in claim 1, in which the weighting is effected by restricting the signal reaching the sensor.

8. The encoder apparatus as claimed in claim 1, in which the width of the sensor predominately decreases towards the ends of the sensor.

9. The encoder apparatus as claimed in claim 1, in which the weighting is effected by at least one signal restricting member configured to restrict the scale signal reaching the sensor elements such that the scale signal detectable by the sensor decreases towards the ends of the sensor.

10. The encoder apparatus as claimed in claim 1, in which the weighting is effected by partially blocking the scale signal reaching the sensor.

11. The encoder apparatus as claimed in claim 1, in which the weighting is effected by a mask having a non-rectangular shape.

12. The encoder apparatus as claimed in claim 11, comprising a light source spaced apart from the mask, and in which light approaching and/or leaving the scale is configured to pass through the mask so as to shape the footprint of the signal detectable by the sensor.

13. The encoder apparatus as claimed in claim 11, in which the mask is formed directly on the sensor.

14. The encoder apparatus as claimed in claim 1, configured such that the outputs are weighted according to a bell-shaped window function.

15. The encoder apparatus as claimed in claim 1, in which the readhead comprises a light source which is configured to illuminate the scale, and optionally configured to illuminate the scale with non-collimated light.

16. The encoder apparatus as claimed in claim 1, in which the readhead comprises a coherent light source for illuminating the scale.

17. The encoder apparatus as claimed in claim 16, in which the spectral bandwidth of the light source is not more than 1 nm.

18. The encoder apparatus as claimed in claim 1, in which the scale signal comprises a fringe field.

19. The encoder apparatus as claimed in claim 18, in which the fringe field comprises an interference fringe.

20. The encoder apparatus as claimed in claim 19, in which the readhead comprises one or more diffraction gratings for producing the interference fringe.

21. The encoder apparatus as claimed in claim 1, in which the sensor comprises an electrograting comprising two or more sets of interdigitated sensor elements, each set being configured to detect a different phase of the fringe field.

22. The encoder apparatus as claimed in claim 21, in which the electrograting comprises a repeating arrangement of the two or more sets of interdigitated sensor elements, and in which the undesirable frequencies are non-integer multiples of the frequency of the repeat.

23. The encoder apparatus as claimed in claim 1, in which the readhead further comprises at least one separate reference mark sensor for detecting at least one reference mark on the scale, in which the at least one reference mark sensor is not positioned within the array of sensor elements.

24. The encoder apparatus as claimed in claim 1, in which the array of sensor elements is a continuous array of sensor elements.

25. The encoder apparatus as claimed in claim 1, in which the shape of the window function is substantially triangular or bell-shaped.

26. The encoder apparatus as claimed in claim 1, in which the undesirable frequencies comprise those frequencies which result in the presence of a non-integer number of cycles over the extent of the sensor, of at least a component frequency of the signal falling on the sensor.

27. The encoder apparatus as claimed in claim 1, in which the undesirable frequencies are due to non-harmonic frequency components in the interference fringe.

* * * * *